ns714B2

United States Patent
Ode et al.

(10) Patent No.: US 9,215,714 B2
(45) Date of Patent: *Dec. 15, 2015

(54) RADIO COMMUNICATION SYSTEM, BASE STATION APPARATUS, TERMINAL APPARATUS, AND RADIO COMMUNICATION METHOD IN RADIO COMMUNICATION SYSTEM

(71) Applicant: FUJITSU LIMITED, Kawasaki, Kanagawa (JP)

(72) Inventors: Takayoshi Ode, Kawasaki (JP); Takaharu Nakamura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 163 days.

This patent is subject to a terminal disclaimer.

(21) Appl. No.: 14/010,633

(22) Filed: Aug. 27, 2013

(65) Prior Publication Data

US 2013/0343331 A1    Dec. 26, 2013

Related U.S. Application Data

(60) Division of application No. 13/303,468, filed on Nov. 23, 2011, now Pat. No. 8,619,725, which is a continuation of application No. PCT/JP2009/002693, filed on Jun. 15, 2009.

(51) Int. Cl.
*H04W 72/04* (2009.01)
*H04B 7/02* (2006.01)
(Continued)

(52) U.S. Cl.
CPC .......... *H04W 72/0466* (2013.01); *H04B 7/024* (2013.01); *H04J 11/0053* (2013.01); *H04W 72/0426* (2013.01); *H04W 72/1231* (2013.01)

(58) Field of Classification Search
None
See application file for complete search history.

(56) References Cited

U.S. PATENT DOCUMENTS 8,310,984 B2    11/2012   Morimoto et al.
8,442,220 B2    5/2013    Kishiyama et al.
(Continued)

FOREIGN PATENT DOCUMENTS

| CN | 101185353 | 5/2008 |
|---|---|---|
| EP | 1 983 792 | 10/2008 |

(Continued)

OTHER PUBLICATIONS

Chinese First Notification of Office Action dated Aug. 11, 2014 from corresponding Application No. 200980159884.2.
International Search Report dated Aug. 11, 2009, from corresponding International Application No. PCT/JP2009/002693.
(Continued)

*Primary Examiner* — Gary Mui
(74) *Attorney, Agent, or Firm* — Katten Muchin Rosenman LLP

(57) ABSTRACT

A radio communication system including: a first and second base station apparatuses which include one or more of sells or sectors respectively; and a terminal apparatus, wherein the first and second base station apparatuses and the terminal apparatus performs radio communication, the first and second base station apparatuses includes: a process unit which performs a scrambling process to a first and second transmission data respectively by using a common scrambling code when the first and second transmission data differing each of the cells or the sectors are transmitted to the terminal apparatus; and a transmission unit which transmits the scrambling processed first and second transmission data to the terminal apparatus respectively, and the terminal apparatus includes a reception unit which receives the first and the second transmission data and performs descrambling process to the first and the second transmission data by using the common scrambling code.

6 Claims, 17 Drawing Sheets

(51) Int. Cl.
  *H04J 11/00* (2006.01)
  *H04W 72/12* (2009.01)

(56) References Cited

U.S. PATENT DOCUMENTS

| | | | |
|---|---|---|---|
| 2007/0171853 | A1 | 7/2007 | Jones et al. |
| 2009/0011698 | A1 | 1/2009 | Yang et al. |
| 2009/0149169 | A1 | 6/2009 | Tanno et al. |
| 2009/0201876 | A1 | 8/2009 | Morimoto et al. |
| 2010/0014660 | A1 | 1/2010 | Kishiyama et al. |
| 2010/0103855 | A1 | 4/2010 | Wang et al. |
| 2010/0128668 | A1 | 5/2010 | Lu et al. |
| 2010/0189075 | A1 | 7/2010 | Iwamura et al. |
| 2010/0315984 | A1 | 12/2010 | Wang et al. |

FOREIGN PATENT DOCUMENTS

| | | |
|---|---|---|
| EP | 2 040 430 | 3/2009 |
| JP | 2006-311475 | 11/2006 |
| JP | 2007-081885 | 3/2007 |
| JP | 2007-214822 | 8/2007 |
| JP | 2008-92379 | 4/2008 |
| KR | 10-2008-0002829 | 1/2008 |
| KR | 10-2008-0015231 | 2/2008 |
| WO | 2008/053932 | 5/2008 |
| WO | 2009/017168 | 2/2009 |
| WO | 2009-023592 | 2/2009 |

OTHER PUBLICATIONS

Nortel, "Cell Clustering for CoMP Transmission/Reception" R1-084464, 3GPP TSG-RAN Working Group 1 Meeting #55, Nov. 10, 2008.
LG Electronics, "Consideration on CoMP in Lte-Advanced" R1-084203, 3GPP TSG RAN WG1 Meeting #55, Nov. 10, 2008.
Samsung. "On Gold Sequence Initialization " R1-081229, 3GPP TSG RAN WG1 Meeting #52bis, Mar. 31, 2008.
3GPP TS 36.211 V8.6.0, 3rd Generation Partnership Project; Technical Specification Group Radio Access Network; Evolved Universal Terrestrial Radio Access (E-UTRA); Physical Channels and Modulation (Release 8), Mar. 2009.
3GPP TS 36.212 V8.6.0, 3rd Generation Partnership Project; Technical Specification Group Radio Access Network; Evolved Universal Terrestrial Radio Access (E-UTRA); Multiplexing and Channel Coding (Release 8), Mar. 2009.
Korean Notice of Preliminary Rejection dated Jun. 19, 2013, from corresponding Korean Application No. 10-2011-7029955.
United States Office Action dated Apr. 22, 2013, from corresponding U.S. Appl. No. 13/303,468.
Notification of Reason for Rejection dated May 7, 2014 from corresponding Japanese Application No. 2013-151316.
European Search Report dated May 6, 2015 from corresponding Application No. 09846113.0.
Qualcomm Europe, "Further Considerations and Link Simulations on Reference Signals in LTE-A", R1-090875, Agenda item: 12.4, 3GPP TSG-RAN WG1 #56, Athens, Greece, Feb. 9-13, 2009.
Chinese 2nd Notification of Office Action dated Apr. 27, 2015 from corresponding Application No. 200980159884.2.

RADIO COMMUNICATION SYSTEM, BASE STATION APPARATUS, TERMINAL APPARATUS, AND RADIO COMMUNICATION METHOD IN RADIO COMMUNICATION SYSTEM

FIELD OF THE INVENTION

The embodiments discussed herein are related to a radio communication system, a base station apparatus, a terminal apparatus, and a radio communication method in a radio communication system.

BACKGROUND ART

In a LTE-A (LTE-Advanced) system, a radio communication by CoMP (Coordinate Multi Point access) is discussed (for example, Non patent Documents 1, 2 below).

The CoMP is performed, for example, when a terminal is located in a region where it can communicate with a plurality of base stations (or sectors), by each base station transmitting data differing from the other by MIMO (Multiple Input Multiple Output) to the terminal.

On the other hand, in a radio communication system such as a LTE, the base station performs a scrambling process to transmission data (for example, Non-patent Documents 3, 4 below). For example, the base station adds transmission data $b(0), \ldots, b(Mbit-1)$ and scrambling codes $c(i)$ and calculate a remainder (modulo) of "2" to perform scrambling. That is, the following formula is satisfied.

$$\tilde{b}(i) = (b(i)+c(i)) \bmod 2 \quad \text{[Expression 1]}$$

Here, the scrambling code $c(i)$ is a GOLD code of the length of "31", and is obtained by the following generating polynomials.

$$c(n) = (x_1(n+N_C) + x_2(n+N_C)) \bmod 2 \quad \text{[Expression 2]}$$

$$x_1(n+31) = (x_1(n+3) + x_1(n)) \bmod 2 \quad \text{[Expression 3]}$$

$$x_2(n+31) = (x_2(n+3) + x_2(n+2) + x_2(n+1) + x_2(n)) \bmod 2 \quad \text{[Expression 4]}$$

Here, the following formula also is satisfied.

$$x_1(0)=1, x_1(n)=0, n=1,2,\ldots,30, N_C=1600 \quad \text{[Expression 5]}$$

Further, the initial value of the scrambling code $c(i)$ is obtained by the following formula.

$$c_{init} = n_{RNTI} \cdot 2^{14} + \lfloor n_s/2 \rfloor \cdot 2^9 + N_{ID}^{cell} \quad \text{[Expression 6]}$$

That is, the initial value of the scrambling code $c(i)$ is a value determined by the followings.

a terminal number:

$$n_{RNTI} \text{ (RNTI: Radio Network Temporary ID)} \quad \text{[Expression 7]}$$

a (physical) cell (or, sector) number:

$$N_{ID}^{cell} \quad \text{[Expression 8]}$$

and, a slot number:

$$n_s \quad \text{[Expression 9]}$$

The above numbers are used to determine the initial value of the scrambling code $c(i)$.

Further, as one of conventional art of this type, for example, there is disclosed (for example, Patent Document 1 listed below) a controlling apparatus or the like, which has transmission assigning means which selects at least two transmission sectors for transmission to a mobile station according to a reception quality notified from the mobile station, and performs a transmission assignment to the mobile station, and transmission means which performs a transmission to the mobile station by using the same scrambling code from the transmission sector for identifying the sector.

Also, for example, there is disclosed (for example, Patent Document 2 listed below) a base station apparatus or the like, which has specific scramble generating means which generates scrambling codes specific to the base station, specific orthogonal sequence generating means which generates orthogonal sequences specific to the sector, and multiplication controlling unit which controls necessity of multiplication of the scrambling codes specific to the base station and the orthogonal sequences specific to the sector according to necessity of software combining for each physical channel.

Patent Document 1: Japanese Laid-open Patent Publication No. 2006-311475
Patent Document 2: Japanese Laid-open Patent Publication No. 2008-92379
Non patent Document 1: R1-084203
Non patent Document 2: 3GPP TS 36.210 V8.6.0
Non patent Document 3: 3GPP TS 36.211 V8.2.0
Non patent Document 4: R1-081229

DISCLOSURE OF THE INVENTION

Problems to be Solved by the Invention

As described above, the initial value of the scrambling code is determined, based on the terminal number, the cell number, and the slot number, wherein the terminal numbers differing between the cells are set by the base station, and the cell numbers differ between the cells. Also, there may be a case that the slot numbers differ between the cells. Therefore, when CoMP transmissions are performed from different cells to a terminal, the initial values of the scrambling codes differ between the cells. Therefore, base station and the terminal generate different scrambling codes, and, by using them, perform processes for scrambling and descrambling. Hence, processes of each base station and the terminal become complicated, and, moreover, the electric power consumption increases.

Also, in the Patent Documents 1 and 2, such a case is not disclosed that different data is transmitted from two sectors. The reason for that is, if different data is transmitted from two sectors by using the same scrambling code, as described in Patent Document 1, a mobile station receives two signals, which are interfered, and is not able to distinguish data transmitted from the two sectors.

Means for Solving the Problem

According to an aspect of the invention, a radio communication system including: a first and second base station apparatuses which include one or more of sells or sectors respectively; and a terminal apparatus, wherein the first and second base station apparatuses and the terminal apparatus performs radio communication, the first and second base station apparatuses includes: a process unit which performs a scrambling process to a first and second transmission data respectively by using a common scrambling code when the first and second transmission data differing each of the cells or the sectors are transmitted to the terminal apparatus; and a transmission unit which transmits the scrambling processed first and second transmission data to the terminal apparatus respectively, and the terminal apparatus includes a reception unit which receives the first and the second transmission data and performs descrambling process to the first and the second transmission data by using the common scrambling code.

Furthermore, according to an another aspect of the invention, a radio communication system including: a first and second base station apparatuses which includes one or more of cells or sectors respectively; and a terminal apparatus, wherein the first and second base station apparatuses and the terminal apparatus perform radio communication, the terminal apparatus includes: a process unit which performs a scrambling process to a first and second transmission data differing each of the cells or the sectors by using a common scrambling code; and a transmission unit which transmits the scrambling processed first and second transmission data to the first and the second base station apparatuses respectively, and the first and second base station apparatuses includes: a reception unit which receives the first and second transmission data and performs descrambling process to the first and second transmission data by using the common scrambling code.

Effectiveness of the Invention

It is enabled to provide a radio communication system, a base station apparatus, a terminal apparatus, and a radio communication method in a radio communication system, which reduce processes of the terminal apparatus. Also, it is enabled to provide a radio communication system or the like which reduces consumption of electric power at a terminal apparatus or a base station apparatus.

MODE FOR CARRYING OUT THE INVENTION

Figure 1:
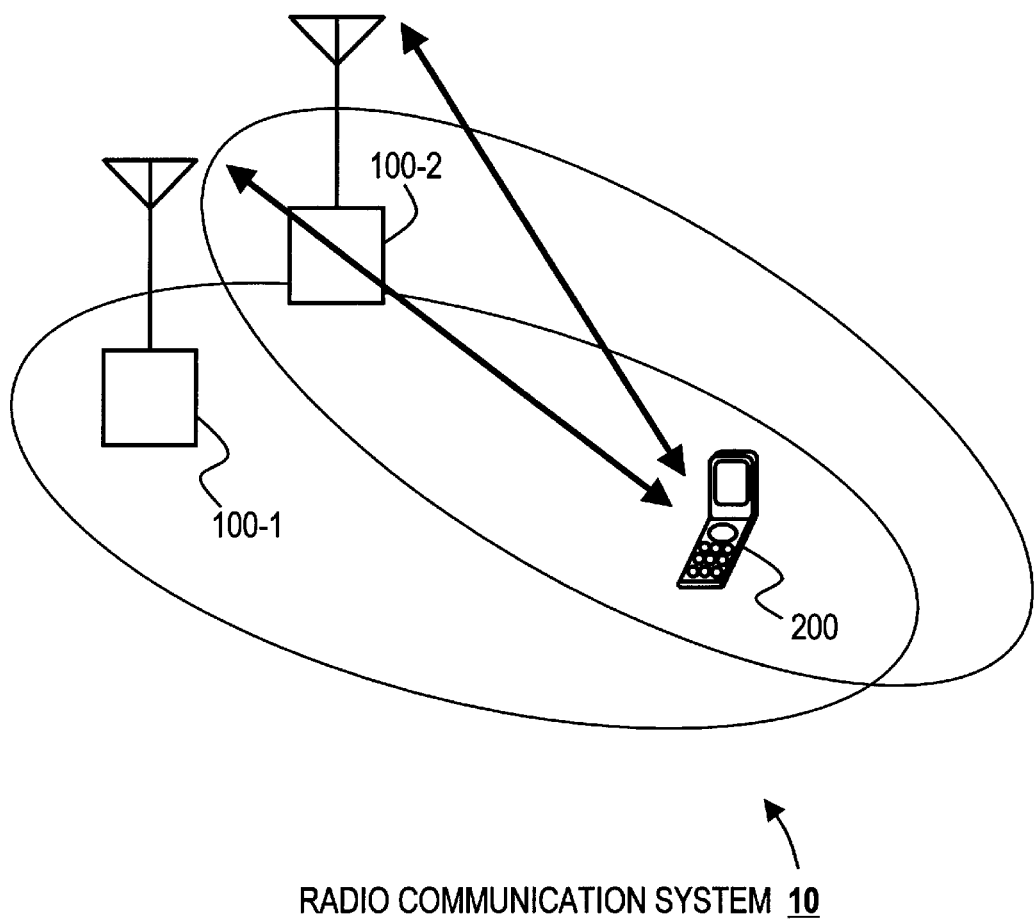
FIG. 1 illustrates a configuration example of a radio communication system.

The embodiments to carry out the present invention will be explained hereafter. FIG. 1 illustrates a configuration example of the radio communication system 10. The radio communication system 10 includes two base station apparatuses (eNB: evolved Node_B, "the base station", hereafter) 100-1, 100-2, and a terminal apparatus (UE: User Equipment, "the terminal" hereafter) 200. The base stations 100-1, 100-2 transmit different data, and the terminal 200 receives it (the downlink). Also, the terminal 200 may transmit different data to the base stations 100-1, 100-2 (the uplink). The base stations 100-1, 100-2 and the terminal 200 may perform, so called, CoMP communication. Hereafter, explanations will be made for the case of the downlink (the first embodiment) and the case of the uplink (the second embodiment). Further, in 3GPP, a "cell" is defined in the same manner as, so called, a "sector", and in the embodiments hereafter, unless otherwise mentioned, a "cell" is explained as equivalent to a "sector".

<The First Embodiment>

Figure 2:
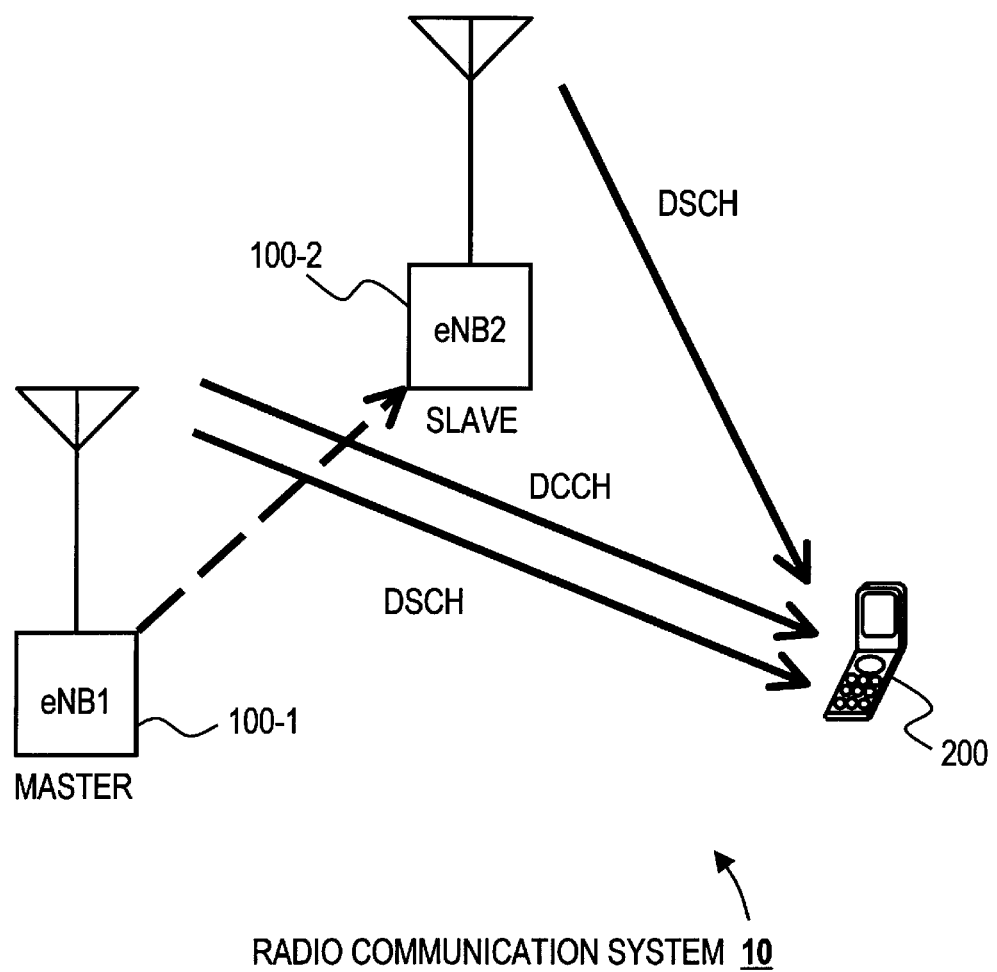
FIG. 2 illustrates a configuration example of a radio communication system in the downlink.

First, the downlink will be explained. FIG. 2 illustrates a configuration example of the radio communication system 10 in the downlink. Among the base stations 100-1, 100-2, the base station 100-1 is a master base station, while the base station 100-2 is a slave base station. The master base station 100-1 is, for example, a base station in connection with the terminal 200 before performing CoMP transmission, and the slave base station 100-2 is, for example, a base station performing CoMP transmission. The master base station 100-1 transmits a control signal to the terminal 200. The terminal 200 receives, according to the control signal, the different transmission data (DSCH) transmitted from the master base station 100-1 and the slave base station 100-2.

<Configuration Example of the Master Base Station>

Figure 3:
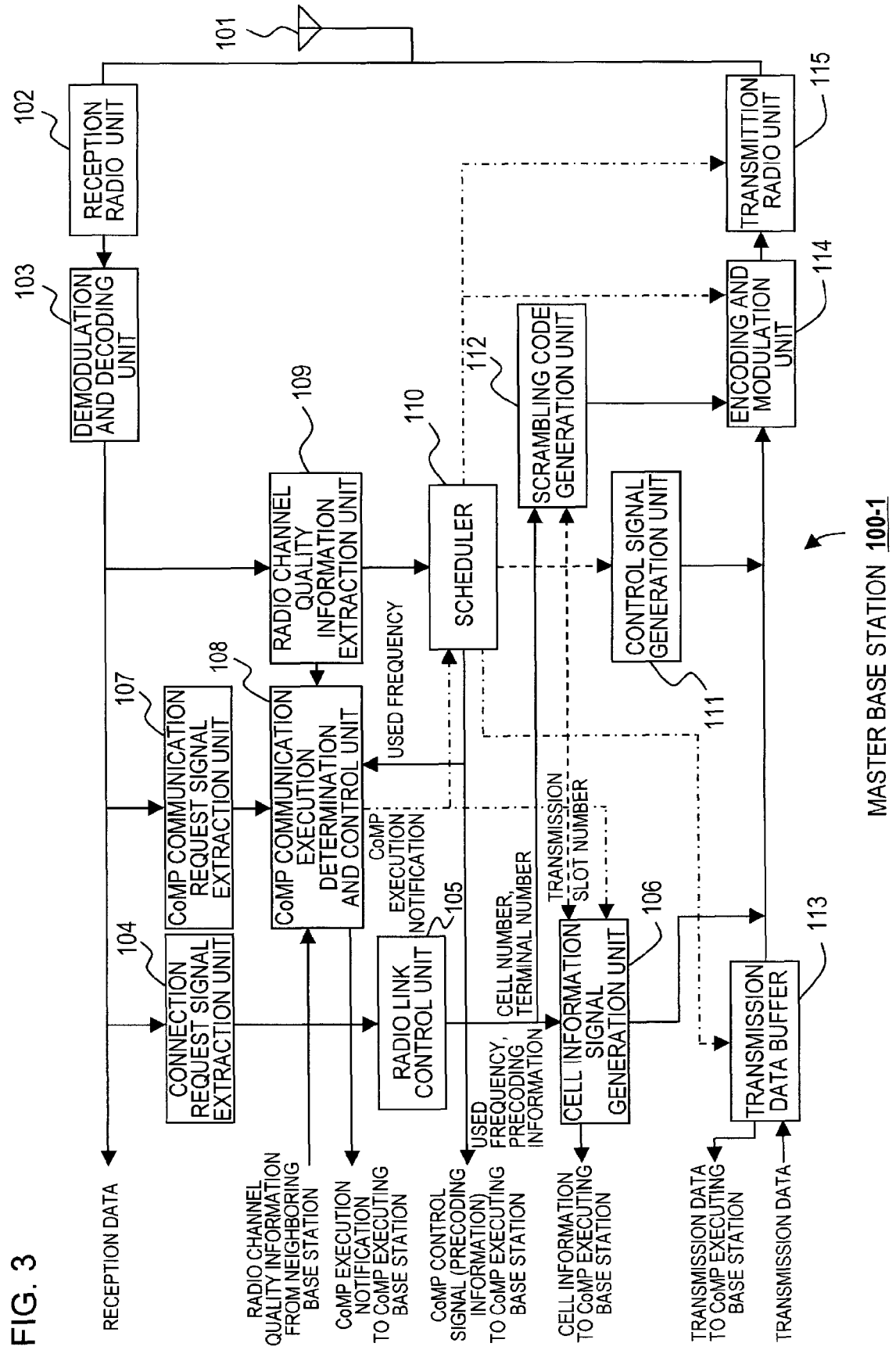
FIG. 3 illustrates a configuration example of a master base station apparatus.
Figure 4:
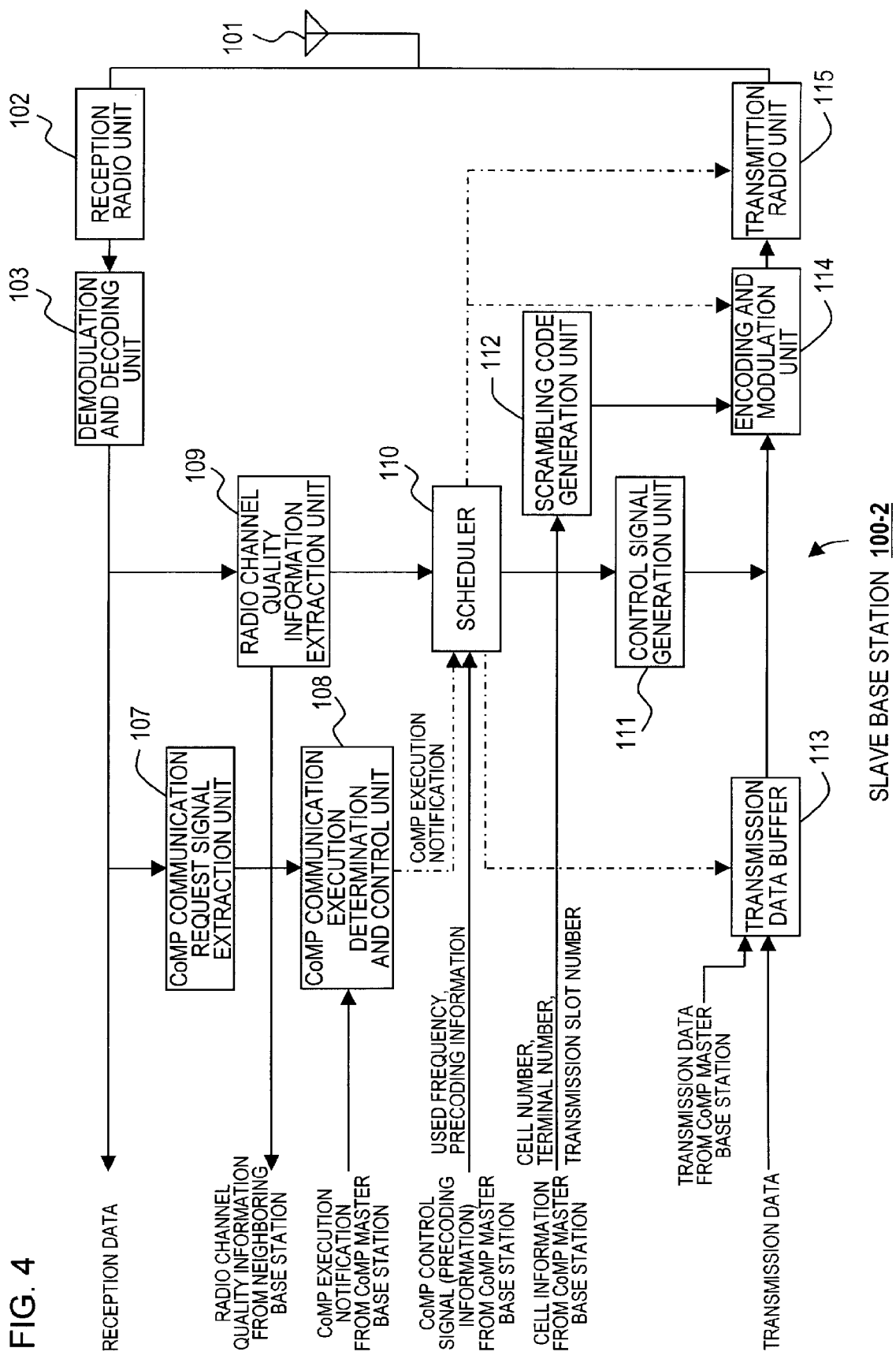
FIG. 4 illustrates a configuration example of a slave base station apparatus.

A configuration example of the master base station 100-1 in the first embodiment will be explained. FIG. 3 is a drawing for illustrating the master base station 100-1.

The master base station 100-1 includes an antenna 101, a reception radio unit 102, a demodulation and decoding unit 103, a connection request signal extraction unit 104, a radio link control unit 105, a cell information signal generation unit 106, a CoMP communication request signal extraction unit 107, a CoMP communication execution determination and control unit (hereafter, "the control unit") 108, a radio channel quality information extraction unit 109, a scheduler 110, a control signal generation unit 111, a scrambling code generation unit 112, a transmission data buffer 113, an encoding and modulation unit 114, and a transmission radio unit 115.

The antenna 101 transmits a radio signal to and/or receives the radio signal from the terminal 200.

The reception radio unit 102 outputs the radio signal received by the antenna 101 as a reception signal.

The demodulation and decoding unit 103 performs demodulation and decoding of the reception signal output from the reception radio unit 102.

The connection request signal extraction unit 104 extracts a connection request signal from the reception signal after demodulation or the like. The connection request signal is a signal, for example, which is used when the terminal 200 performs a request for a link connection with the master base station 100-1.

The radio link control unit 105 takes in the connection request signal from the connection request signal extraction unit 104, selects, for example, a cell number and a terminal number from among a plurality of internally held cell numbers and terminal numbers, and then outputs the selected cell number and terminal number to the cell information signal generation unit 106 and the scrambling code generation unit 112.

The cell information signal generation unit 106 generates a cell information from the cell number and the terminal number output from the radio link control unit 105 and a slot number output from the scheduler 110. The generated cell information is transmitted as a cell information signal to the base station (for example, the slave base station 100-2), which performs CoMP transmission. Also, the cell information signal is output to the encoding and modulation unit 114 to be transmitted to the terminal 200.

The CoMP communication request signal extraction unit 107 extracts a CoMP communication request signal from the reception signal output from the demodulation and decoding unit 103. The CoMP communication request signal is a signal, for example, transmitted from the terminal 200 when the terminal 200 will perform CoMP communication.

The control unit 108 determines whether or not to execute CoMP transmission, and, when determining to perform CoMP transmission, notifies the slave base station 100-2 of CoMP transmission execution notice. The control unit 108 determines whether or not to execute CoMP transmission based on, for example, a radio channel quality output from the radio channel quality information extraction unit 109 and a radio channel quality transmitted from the slave base station 100-2. The CoMP transmission execution notice is also output to the scheduler 110 and the cell information signal generation unit 106. Details of determination of execution of CoMP transmission will be explained below.

The radio channel quality information extraction unit 109 extracts radio channel quality information from the reception signal output from the demodulation and decoding unit 103. The radio channel quality information is information, for example, which is transmitted from the terminal 200.

The scheduler 110 determines (performs a scheduling), based on the radio channel quality information output from the radio channel quality information extraction unit 109, an encoding rate, a modulation format, or the like executed in downlink communication with the terminal 200. The scheduler 110 outputs the scheduling information related to the determined encoding rate or the like to the control signal generation unit 111. Also, the scheduler 110 transmits a frequency to be used and precoding information, among the scheduling information, as a CoMP control signal to the slave base station 100-2, and outputs the slot number to the cell information signal generation unit 106 and the scrambling code generation unit 112. Further, the scheduler 110 controls the encoding and modulation unit 114 and the transmission radio unit 115 so that an encoding process or the like to the transmission data is performed according to the determined scheduling information.

The control signal generation unit 111 generates a control signal including the scheduling information output from the scheduler 110, and outputs it to the encoding and modulation unit 114.

The scrambling code generation unit 112 generates the initial value of the scrambling code and subsequent scrambling codes one after another, based on the slot number output from the scheduler 110 and the cell number and the terminal number output from the radio link control unit 105. Details of the scrambling code generation unit 112 will be explained below.

The transmission data buffer 113 temporary stores the transmission data transmitted to the terminal 200 from the master base station 100-1.

The encoding and modulation unit 114 scrambles the transmission data output from the transmission data buffer 113 by using the scrambling code generated by the scrambling code generation unit 112, and encodes and modulates the scrambled transmission data based on the scheduling information. The encoding and modulation unit 114 performs encoding or the like to the cell information output from the cell information signal generation unit 106 and to the control signal output from the control signal generation unit 111, and may further perform thereto the scrambling process.

The transmission radio unit 115 performs a weighting process of the transmission data or the like to the transmission data or the like output from the encoding and modulation unit 114, according to the precoding information generated by the scheduler 110. Also, the transmission radio unit 115 generates, for example, a pilot signal (or, a known signal). The output from the transmission radio unit 115 is transmitted as the radio signal via the antenna 101 to the terminal 200.

<A Configuration Example of the Slave Base Station>

Next, a configuration example of the slave base station 100-2 in accordance with the first embodiment will be explained. The slave base station 100-2 is similarly configured to the master base station 100-1.

The control unit 108 takes in the CoMP communication request signal from the CoMP communication request signal extraction unit 107, further receives the CoMP execution notice from the master base station 100-1, and outputs the CoMP execution notice to the scheduler 110.

The scheduler 110 performs scheduling of the downlink based on radio channel quality information output from the radio channel quality information extraction unit 109. Also, the scheduler 110 receives the CoMP execution notice from the control unit 108, receives the CoMP control signal from the master base station 100-1, and performs a scheduling for the CoMP transmission. The scheduler controls the encoding and modulation unit 114 and the transmission radio unit 115 so that an encoding process or the like is performed according to the scheduling.

The scrambling code generation unit 112 takes in the cell information from the master base station 100-1, and generates the initial value of the scrambling code and subsequent scrambling codes one after another based on the cell information. Details thereof will be explained below. Since the scrambling code generation unit 112 generates the scrambling code based on the cell information notified from the master base station 100-1, the master base station 100-1 and the slave base station 100-2 generate same scrambling codes. The generated scrambling codes are output to the encoding and modulation unit 114, and the scrambling process is performed to the transmission data transmitted from the slave base station 100-2.

<A Configuration Example of the Terminal>

Figure 5:
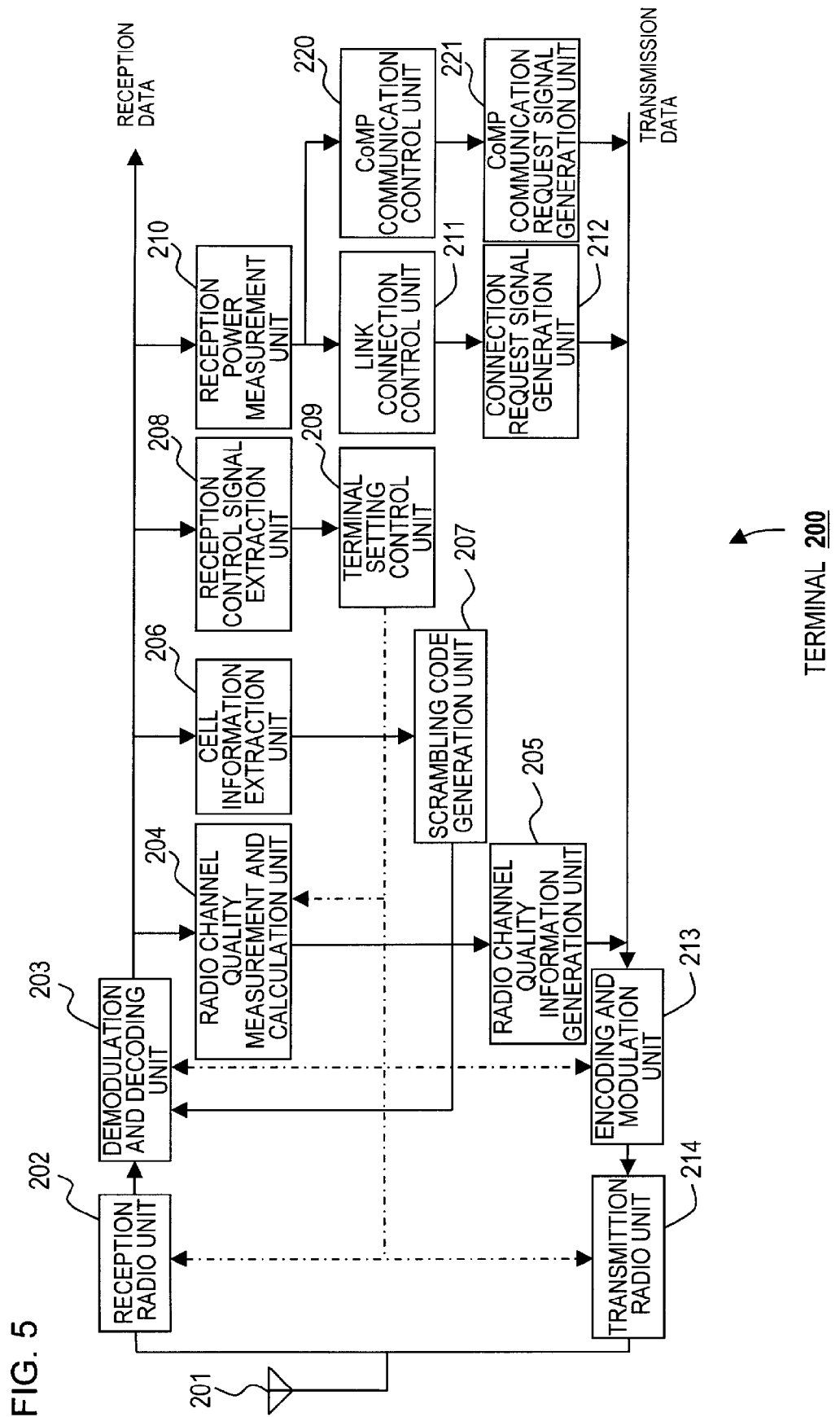
FIG. 5 illustrates a configuration example of a terminal apparatus.

Next, a configuration example of the terminal 200 will be explained. FIG. 5 illustrates a configuration example of the terminal 200.

The terminal 200 includes an antenna 201, a reception radio unit 202, a demodulation and decoding unit 203, a radio channel quality measurement and calculation unit (hereafter, calculation unit) 204, a radio channel quality information generation unit 205, a cell information extraction unit 206, a scrambling code generation unit 207, a reception control signal extraction unit 208, a terminal setting control unit 209, a reception power measurement unit 210, a link connection control unit 211, a connection request signal generation unit 212, an encoding and modulation unit 213, a transmission radio unit 214, a CoMP communication control unit 220, and a CoMP communication request signal generation unit 221.

The antenna 201 transmits the radio signal to and/or receives the radio signal from the base stations 100-1, 100-2.

The reception radio unit 202 outputs the radio signal received by the antenna 201 as the reception signal.

The demodulation and decoding unit 203 descrambles the reception signal by using the scrambling code generated by the scrambling code generation unit 207, and performs demodulation and decoding to the reception signal according to demodulation method or the like set by the terminal setting control unit 209.

The calculation unit 204 measures the radio quality of each radio channel on the pilot signal or the like transmitted from the master base station 100-1 or the slave base station 100-2. The calculation unit 204 measures the to radio channel quality by, for example, determining SINR (Signal to Interference Noise Ratio) or the like of the pilot signal.

The radio channel quality information generation unit 205 generates radio channel quality information based on the radio channel quality output from the calculation unit 204. The radio channel quality information includes, for example, CQI (Channel Quality Indicator) or the like. The generated radio channel quality information is output to the encoding and modulation unit 213.

The cell information extraction unit 206 extracts the cell information from among the reception signal output from the demodulation and decoding unit 203. The extracted cell information is output to the scrambling code generation unit 207.

The scrambling code generation unit 207 generates the initial value of the scrambling code and the subsequent scrambling codes one after another, based on the cell information including the cell number, the terminal number, and the slot number. The scrambling code generation unit 107 outputs the generated scrambling codes to the demodulation and decoding unit 203.

The reception control signal extraction unit 208 extracts the control signal from the reception signal, and outputs it to the terminal setting control unit 209.

The terminal setting control unit 209 controls the reception radio unit 202 and the demodulation and decoding unit 203 so that the reception data or the like from the base station 1000-1,100-2 are demodulated and decoded according to the scheduling information included in the control signal.

The reception power measurement unit 210 measures, for example, the reception power of the pilot signal from the reception signal, and outputs the determination result to the link connection control unit 211 and the CoMP communication control unit 220.

The link connection control unit 211 determines whether or not to connect the links with the base stations 100-1, 100-2 based on the reception power. The link connection control unit 211 determines to connect the link, when, for example, the reception power is equal to or more than a threshold value, and determines not to connect the link, otherwise. The link connection control unit 211, when determining to connect the link, outputs a command signal to the connection request signal generation unit 212.

The connection request signal generation unit 212 generates, based on the command signal, the connection request signal, and outputs it to the encoding and modulation unit 213.

When the reception power is, for example, equal to or more than the threshold value, the CoMP communication control unit 220 outputs a generation command of the CoMP communication request signal to the CoMP communication request signal generation unit 221.

The CoMP communication request signal generation unit 221 generates, based on a command from the CoMP communication control unit 220, the CoMP communication request signal, and outputs it to the encoding and modulation unit 213.

The encoding and modulation unit 213 performs an encoding and modulating process to the radio channel quality information, the connection request signal, the CoMP communication request signal, and the like.

The transmission radio unit 214 performs control or the like of transmission power to the encoded radio channel quality information and the like, and outputs it as the radio signal to the antenna 201. The radio channel quality information and the like is transmitted as the radio signal to the base stations 100-1, 100-2.

<Configuration Examples of the Scrambling Code Generation Units>

Figure 6:
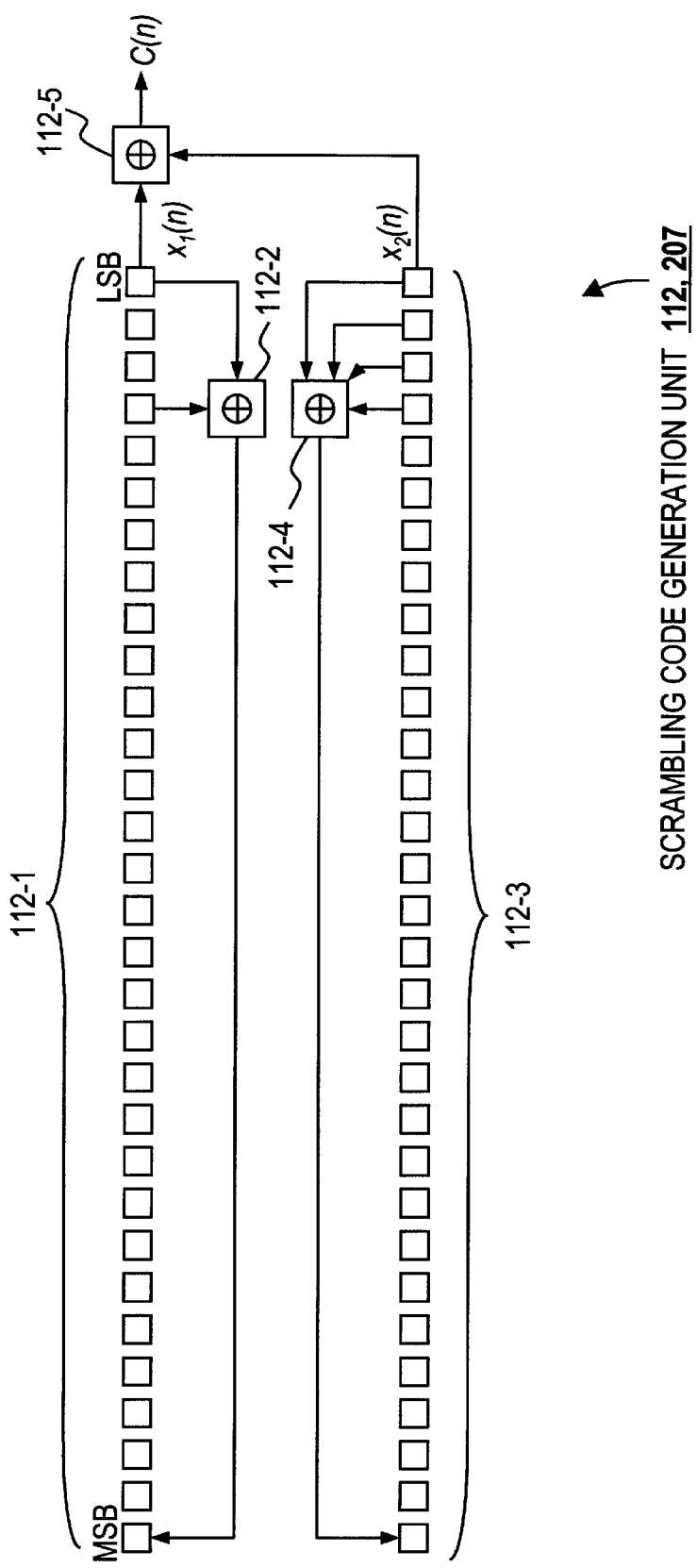
FIG. 6 illustrates a configuration example of a scrambling code generation unit.

Next, configuration examples of the scrambling code generation unit 112 of the master base station 100-1 and the slave base station 100-2, and the scrambling code generation unit 207 of the terminal 200 will be explained. FIG. 6 illustrates configuration examples of the scrambling code generation unit 112, 207, which are known GOLD code generators.

The scrambling code generation units 112, 207 include first and second registers (or, flip-flops) 112-1, 112-3, and first through third XOR (exclusive logical add) circuits 112-2, 112-4, and 112-5.

The scrambling code generation units 112, 207 generate GOLD codes (or, a scrambling codes) of a length of "31", and output thereof will be the scrambling codes c(n). The polynomials for generating the scrambling code c(n) are described as the above Number 2 through Number 4.

<Operation Example of the Downlink>

Figure 7:
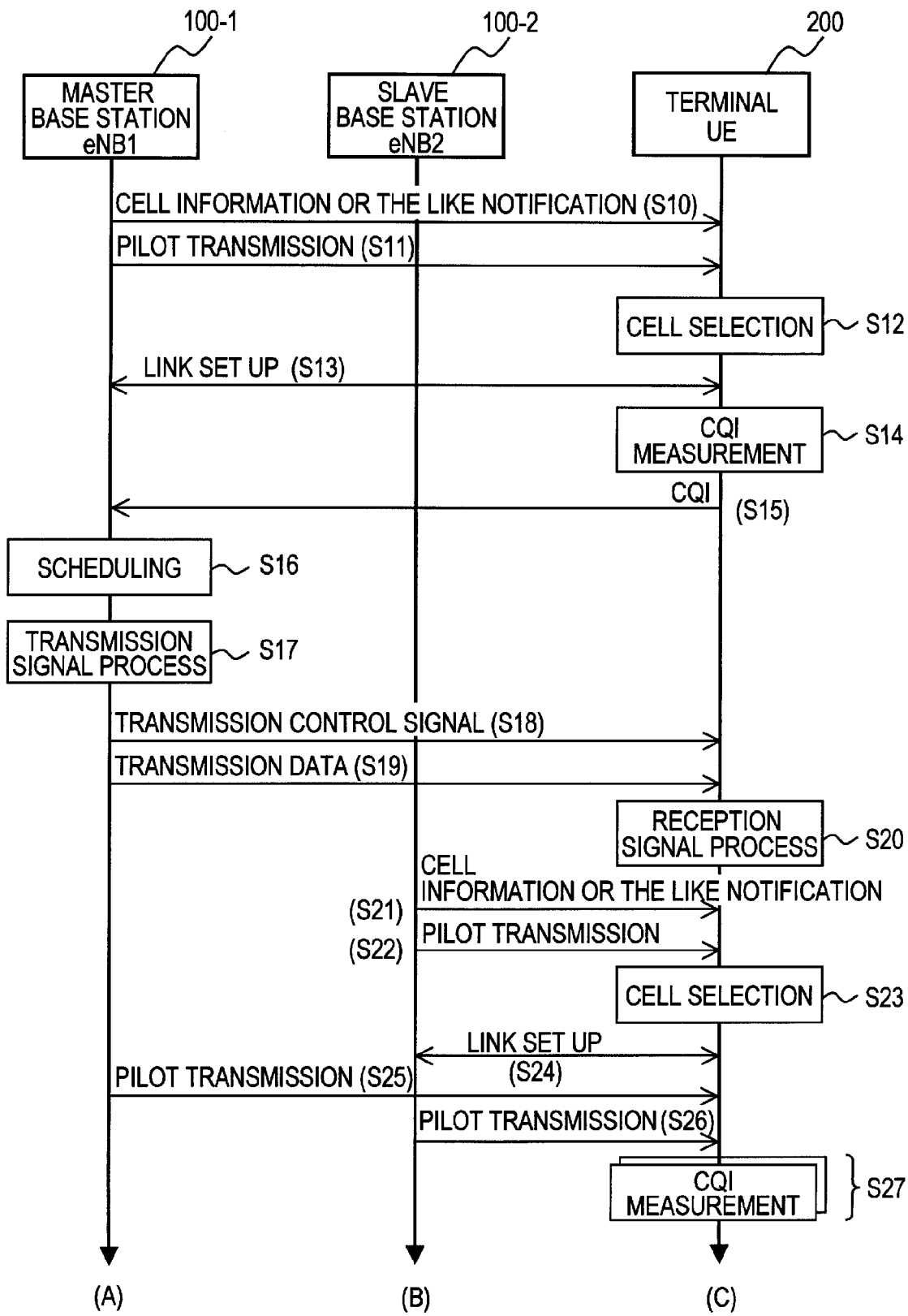
FIG. 7 is a flow-chart illustrating an operation example.
Figure 8:
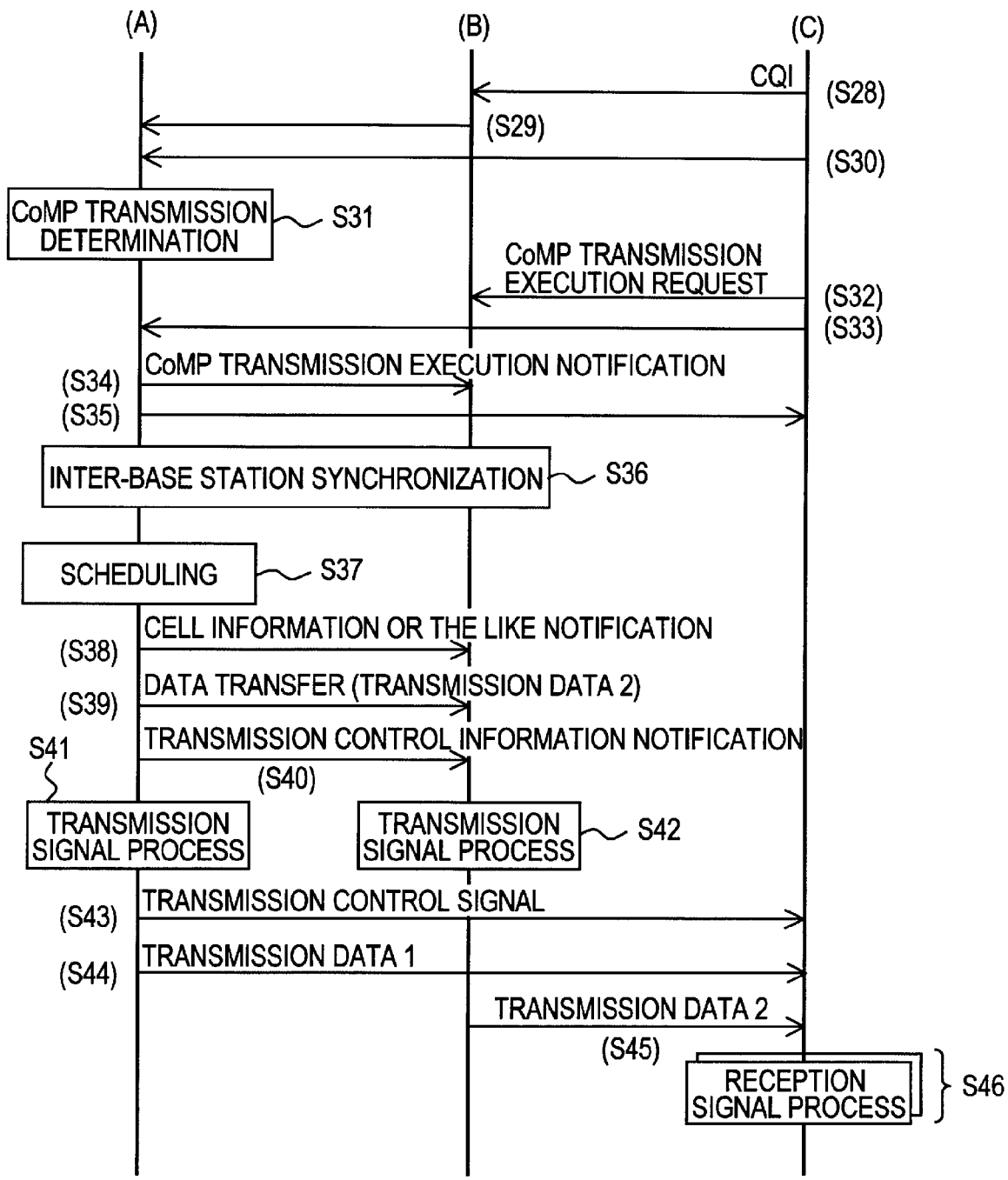
FIG. 8 is a flow-chart illustrating an operation example.

Next, an operation example in accordance with the first embodiment will be explained. FIG. 7 and FIG. 8 are flowcharts for illustrating an operation example. Here, the terminal 200 is assumed to be located in a region where connection is connectable to both of the master base station 100-1 and the slave base station 100-2.

First, the master base station 100-1 notifies the terminal 200 of the cell information or the like (S10). The cell information notified by the master base station 100-1 may include, for example, the cell information (the cell number, the terminal, and the slot number) generated by the cell information signal generation unit 106.

Then, the master base station 100-1 transmits the pilot signal (S11). For example, the pilot signal is generated by the transmission radio unit 115 of the master base station 100-1.

Then, based on the received pilot signal or the like, the terminal 200 selects the cell to be an object of transmission (S12), and sets up a link with the selected cell (S13). For example, the reception power measurement unit 210 of the terminal 200 measures the reception power of the pilot signal, and the link connection control unit 211 determines the connection of the link, so that the cell (for example, the master base station 100-1) is selected. Then, the connection request signal generation unit 212 generates the connection request signal and transmits it to the master base station 100-1, thus setting up the link. The terminal 200 first connects with the master base station 100-1.

Then, the terminal 200 measures the quality of the radio channel (for example, CQI) with the master base station 100-1 (S14), and transmits the radio channel quality information to the master base station 100-1 (S15). For example, the calculation unit 204 of the terminal 200 measures the radio channel quality based on the pilot signal, and the radio channel quality information generation unit 205 generates the radio channel quality information, so that the information is transmitted to the master base station 100-1.

Then, the master base station 100-1 performs the scheduling based on the radio channel quality information (S16). For example, the scheduler 110 of the master base station 100-1 performs the scheduling based on the radio channel quality information extracted by the radio channel quality information extraction unit 109.

Then, the master base station 100-1 performs a transmission signal process (S17). For example, the encoding and modulation unit 114 reads out the transmission data stored in the transmission data buffer 113, and performs encoding process or the like according to the encoding rate scheduled by the scheduler 110. Also, to the control signal including the scheduling information generated by the control signal generation unit 111, an encoding process or the like is performed by the encoding and modulation unit 114.

Then, the master base station 100-1 transmits the control signal and the transmission data to the terminal 200 (S18, S19).

The terminal 200 receives the control signal and the transmitted data, and performs a reception signal process (S20). For example, the terminal setting control unit 209 controls the reception radio unit 202 and the demodulation and decoding unit 203, so that demodulation and decoding are performed according to the scheduling information included in the received control signal.

Then, the terminal 200 receives the cell information and the like notified from the slave base station 100-2 and the pilot signal (S21, S22). Then, the terminal 200 selects the slave base station 100-2 as a connecting base station (S23), and sets up a link with the slave base station 100-2 (S24).

Then, between the terminal 200 and the base stations 100-1, 100-2, the process for CoMP transmission is performed. First, the terminal 200 receives the pilot signal from each of the master base station 100-1 and the slave base station 100-2 (S25, S26), and measures the channel quality of the each radio link (S27). For example, by the calculation unit 204 of the terminal 200, each radio channel quality is measured. Further, at this time, for facilitating identifying the pilot signal from the master base station 100-1 and the slave base station 100-2, the pilot signal may be generated based on the cell number of the master base station 100-1 and the original cell number of the slave base station 100-2.

Then, the terminal 200 transmits respectively measured radio channel qualities to the slave base station 100-2 and the master base station 100-1 (S28, S30). For example, by the radio channel quality information generation unit 205, each radio channel quality information is generated and transmitted.

The slave base station 100-2 transmits to the master base station 100-1 the radio channel quality information transmitted from the terminal 200 (S29). For example, the radio channel quality information extraction unit 109 of the slave base station 100-2 transmits to the master base station 100-1 the extracted radio channel quality between the slave base station 100-2 and the terminal 200.

Then, the master base station 100-1 determines whether or not the CoMP transmission is possible (S31). For example, the control unit 108 of the master base station 100-1 determines that the CoMP communication is possible when the radio channel quality from the slave base station 100-2 and the radio channel quality extracted by the CoMP communication request signal extraction unit 107 are both equal to or more than the threshold value. The threshold value to be compared with the radio channel quality from the master base station 100-1 and the threshold value to be compared with the radio channel quality from the slave base station 100-2 may be the same, or may be different. Further, the control unit 108 terminates the series of processes when determining that the CoMP transmission is not possible.

Then, the terminal 200 transmits the CoMP transmission execution request to the slave base station 100-2 and the master base station 100-1 (S32, S33). For example, the CoMP communication control unit 220 of the terminal 200 outputs a command for the execution request, and, from the CoMP communication request signal generation unit 221, the execution request signal is transmitted.

The master base station 100-1 determines that CoMP transmission is possible (S31), receives the CoMP execution request from the terminal 200 (S33), and transmits the CoMP execution notices to the slave base station 100-2 and the terminal 200 (S34, S35). For example, the control unit 108 of the master base station 100-1 transmits the CoMP execution notice to the slave base station 100-2. Also, for example, the control unit 108 outputs to the scheduler 110 the CoMP execution notice, and, from the scheduler 110, the CoMP execution notice is transmitted to the terminal 200 as the control signal.

Then, the master base station 100-1 and the slave base station 100-2 perform a process to synchronize with inter-base station (S36). This is for enabling the transmission data to be synchronized in the CoMP transmission and transmitted to the terminal 200. For example, the control units 108 of the master base station 100-1 and the slave base station 100-2 perform transmission and reception of signal each other, and, by phase synchronization, the process for synchronization is performed.

Then, the master base station 100-1 performs the scheduling for the CoMP transmission (S37). For example, the scheduler 110 receives the CoMP execution notice from the control unit 108, and performs the scheduling based on the radio channel quality or the like (S29, S30). In the generated scheduling information, an operation frequency used for CoMP transmission and the precoding information are included.

Then, the master base station 100-1 transmits the cell information to the slave base station 100-2 (S38). For example, the cell information signal generation unit 106 takes in the cell number and the terminal number from the radio link control unit 105, takes in the slot number output from the scheduler 110, generates and transmits the cell information including the cell number, the terminal number, and the slot number. For example, the cell number and the terminal number are generated by the radio link control unit 105 on setting up the link with the terminal 200 (S13). The cell information signal generation unit to 106 may read out the cell number or the like from the radio link control unit 105, triggered by the CoMP execution notice from the control unit 108. As for the slot number, the scheduler 110 may output the number to cell information signal generation unit 106 by the scheduling (S37). Further, the terminal 200 may notify the determined and calculated radio channel quality with the slave base station 100-2 directly to the master base station 100-1.

Then, the master base station 100-1 transfers the transmission data (for example, the transmission data 2) to the slave base station 100-2 (S39). For example, the scheduler 110 of the master base station 100-1 reads out a part of the transmission data stored in the transmission data buffer 113 (for example, the transmission data 2) and transmits it to the slave base station 100-2. The transmission data buffer 113 of the slave base station 100-2 stores the transmission data transmitted from the master base station 100-1. The transmission data 1 and the transmission data 2 are, for example, different transmission data between the cells.

Then, the master base station 100-1 notifies the transmission controlling information to the slave base station 100-2 (S40). For example, the scheduler 110 transmits the scheduling information including the precoding information and the like to the slave base station 100-2 as the transmission controlling information (S37).

Then, the master base station 100-1 and the slave base station 100-2 perform transmission signal processes (S41, S42). For example, the scrambling code generation unit 112 of the master base station 100-1 generates the scrambling code based on the cell number and the terminal number from the radio link control unit 105 and the slot number from the scheduler 110. The encoding and modulation unit 114 performs the scrambling process to the transmission data 1 by using the scrambling code. Then, the transmission data 1 is encoded according to the scheduling (S37). On the other hand, the scrambling code generation unit 112 of the slave base station 100-2 generates the scrambling code by using the cell information transmitted from the master base station 100-1 (S38), and the encoding and modulation unit 114 performs the scrambling process to the transmission data 2. Then, the transmission data 2 is encoded based on the transmission controlling information transmitted from the master base station 100-1. As such, since the master base station 100-1 and the slave base station 100-2 generates the scrambling code from the common cell number, terminal number, and slot number, same scrambling codes are generated.

Then, the master base station 100-1 transmits the control signal and the transmission data to the terminal 200 (S43, S44). In the control signal, besides the encoding rate or the like used for the CoMP transmission, the operation frequency and the precoding information may be included, and the cell information generated by the cell information signal generation unit 106 may be also included therein.

Then, the slave base station 100-2 transmits different transmission data (for example, the transmission data 2) from the transmission data transmitted from the master base station 100-1 to the terminal 200 (S45). For example, the transmission data 1 and the transmission data 2 are weighted according to the precoding information and transmitted.

Then, the terminal 200 performs reception signal processes to the transmission data transmitted from the master base station 100-1 and the slave base station 100-2 (S46). For example, the terminal setting control unit 209 of the terminal 200 controls the reception radio unit 202 and the demodulation and decoding unit 203 according to the scheduling information included in the control signal so as to receive each transmitted data from the master base station 100-1 and the slave base station 100-2 (S43). At this time, the scrambling code generation unit 207 of the terminal 200 generates the scrambling code based on the cell information (S10 or S43). Since the cell information is same to those used by the master base station 100-1 and the slave base station 100-2, the terminal 200 may generate the scrambling code same to the scrambling codes generated by the base stations 100-1, 100-2. The demodulation and decoding unit 203 performs the descrambling process to the transmission data 1 and the transmission data 2 based on the scrambling code.

As such, in the first embodiment, since the master base station 100-1, when performing the CoMP transmission, transmits the cell information to the slave base station 100-2 (S38), information to generate the scrambling code is shared, and the common scrambling code is generated. Therefore, in comparison with a case that the base stations 100-1, 100-2 generate different scrambling codes and perform the scrambling process, this radio communication system 10 may reduce the processes. Also, since the processes are reduced, electric power consumption by the terminal 200 and the base stations 100-1, 100-2 is reduced.

Also, the master base station 100-1 transmits the precoding information to the slave base station 100-2 (S40), and the two base stations 100-1, 100-2 transmit different data to the terminal 200 based on the precoding information. Therefore, even if different data is transmitted to the two base stations 100-1, 100-2 by using the common scrambling code, the terminal 200 is able to perform the reception process based on the precoding information included in the control signal (S43, S46), and thus interference of the two different data is avoided.

<The Second Embodiment>

Next, an example of the uplink will be explained. The second embodiment relates to an example of the uplink such that data is transmitted from the terminal 200 to the base stations 100-1, 100-2.

Figure 9:
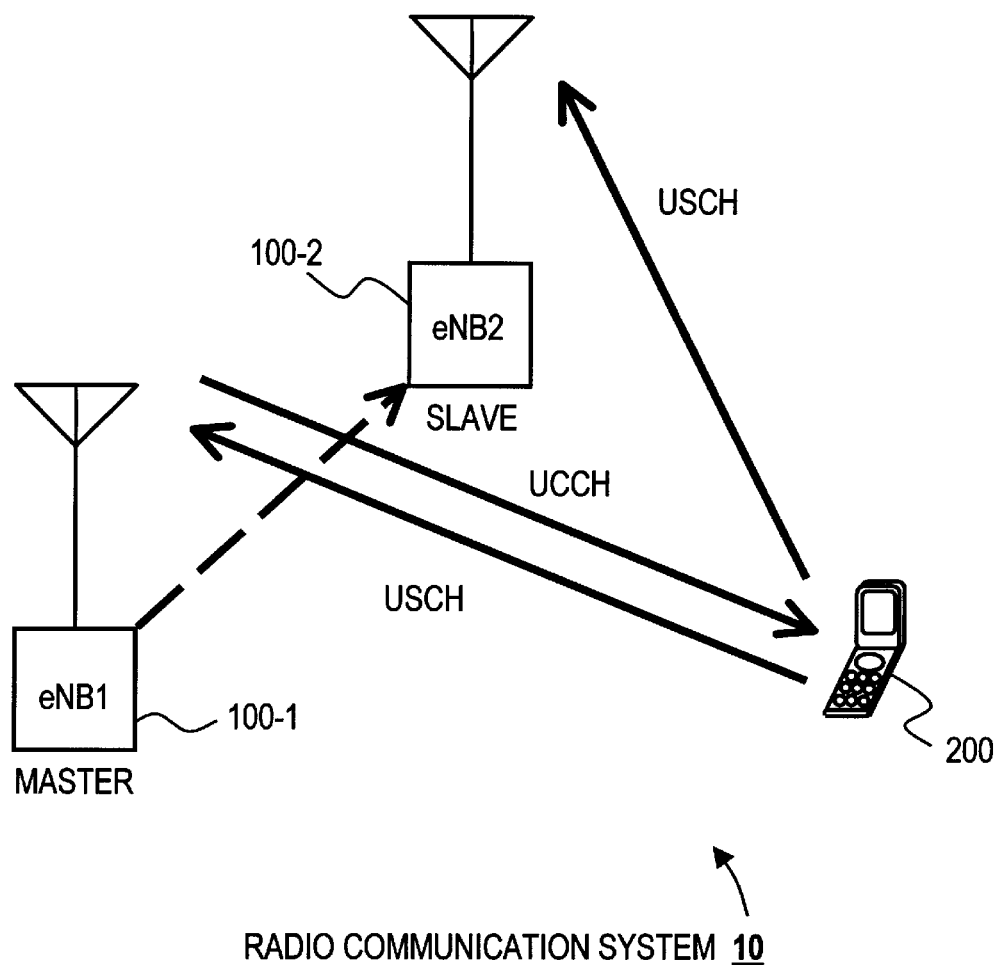
FIG. 9 illustrates a configuration example of a radio communication system in the uplink.

FIG. 9 illustrates a configuration example of the radio communication system 10 in accordance with the second embodiment. The master base station 100-1 transmits the control signal to the terminal 200. The terminal 200 transmits, according to the received control signal, the different transmission data (USCH) to the master base station 100-1 and the slave base station 100-2.

<A Configuration Example of the Master Base Station>

Figure 10:
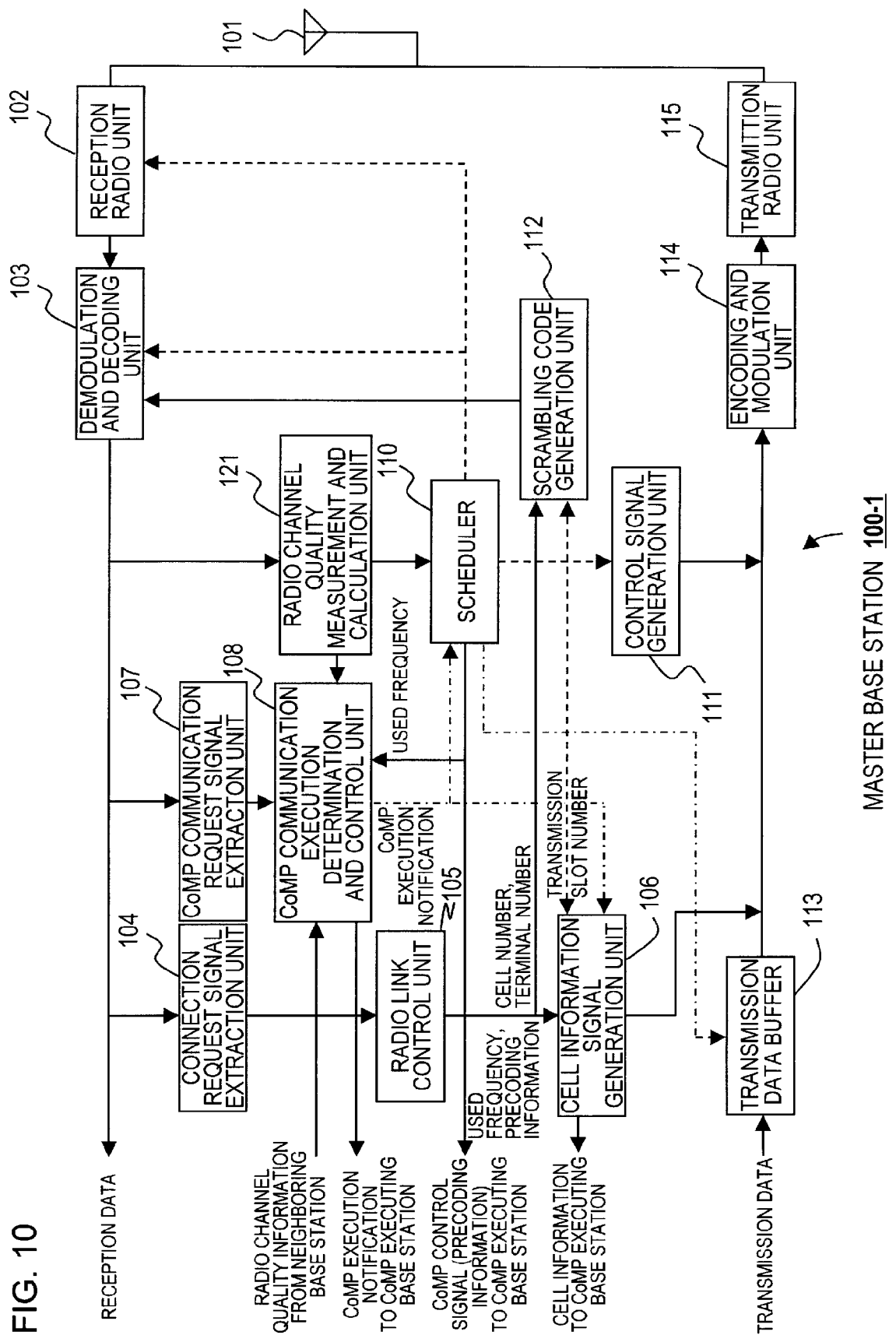
FIG. 10 illustrates a configuration example of a master base station apparatus.

Next, a configuration example of the master base station 100-1 in accordance with the second embodiment will be explained. FIG. 10 illustrates a configuration example of the master base station 100-1.

The master base station 100-1 further includes a radio channel quality measurement and calculation unit (hereafter, a calculation unit) 121. The calculation unit 121 determines radio channel quality between base station 100-1 and the terminal 200 based on the pilot signal or the like transmitted from the terminal 200, and determines the radio channel quality (for example, CQI).

Also, the scheduler 110 of the master base station 100-1, for performing the scheduling of the uplink, controls demodulation and decoding unit 103 and the reception radio unit 102 according to the generated scheduling information.

Further, the scrambling code generation unit 112, for performing the descrambling process to the transmission data or the like transmitted from the terminal 200, outputs the generated scrambling code to the demodulation and decoding unit 103.

<A Configuration Example of the Slave Base Station>

Figure 11:
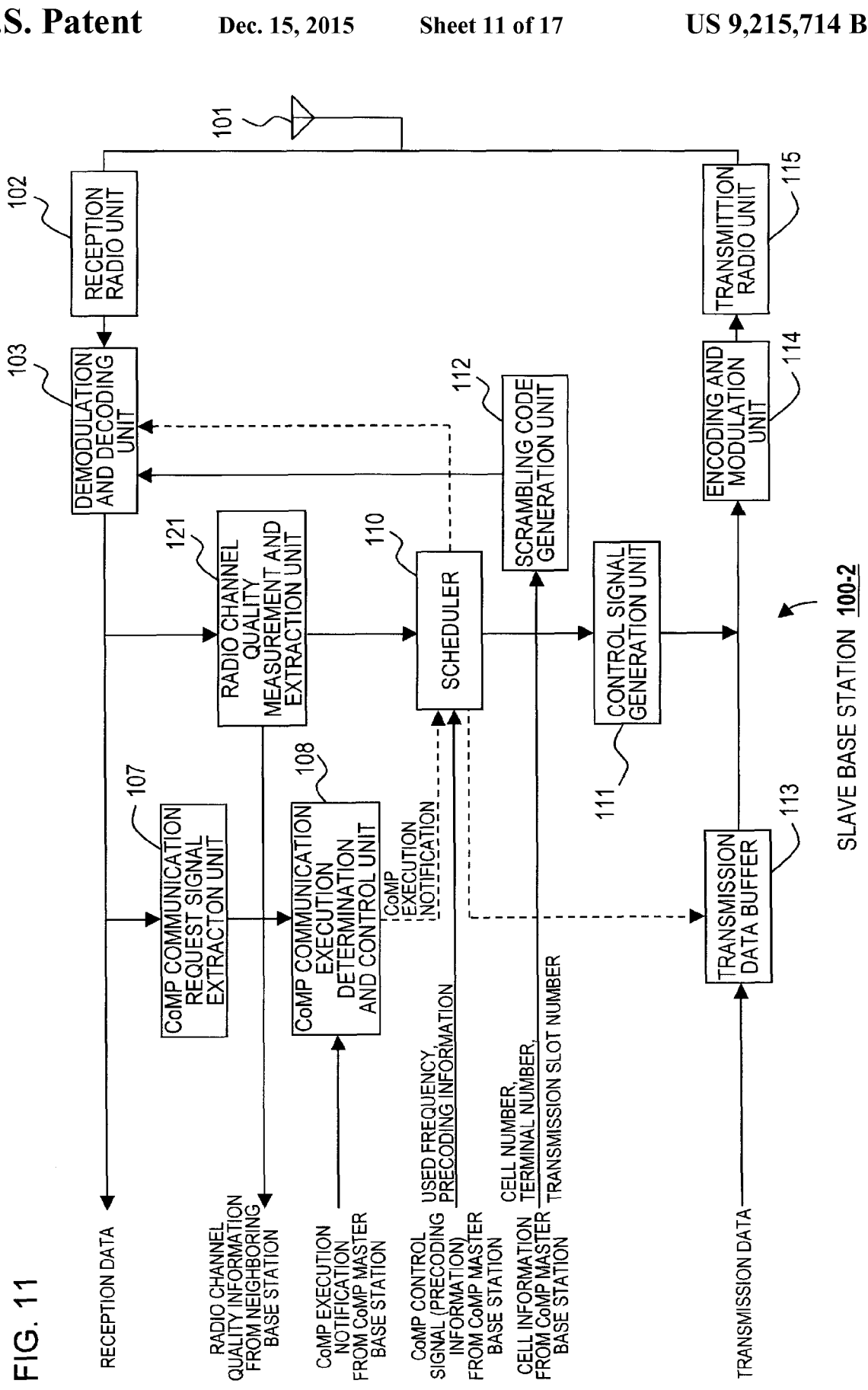
FIG. 11 illustrates a configuration example of a slave base station apparatus.

Next, a configuration example of the slave base station 100-2 in accordance with the second embodiment will be explained. FIG. 11 illustrates a configuration example of the slave base station 100-2.

The slave base station 100-2 further includes the calculation unit 121, as well.

Also, the scheduler 110 of the slave base station 100-2, for performing the scheduling of the uplink, controls the demodulation and decoding unit 103 and the reception radio unit 102 according to the scheduling information.

Further, the scrambling code generation unit 112, for performing the descrambling process to the transmission data or the like transmitted from the terminal 200, outputs the generated scrambling code to the demodulation and decoding unit 103.

<A Configuration Example of the Terminal>

Figure 12:
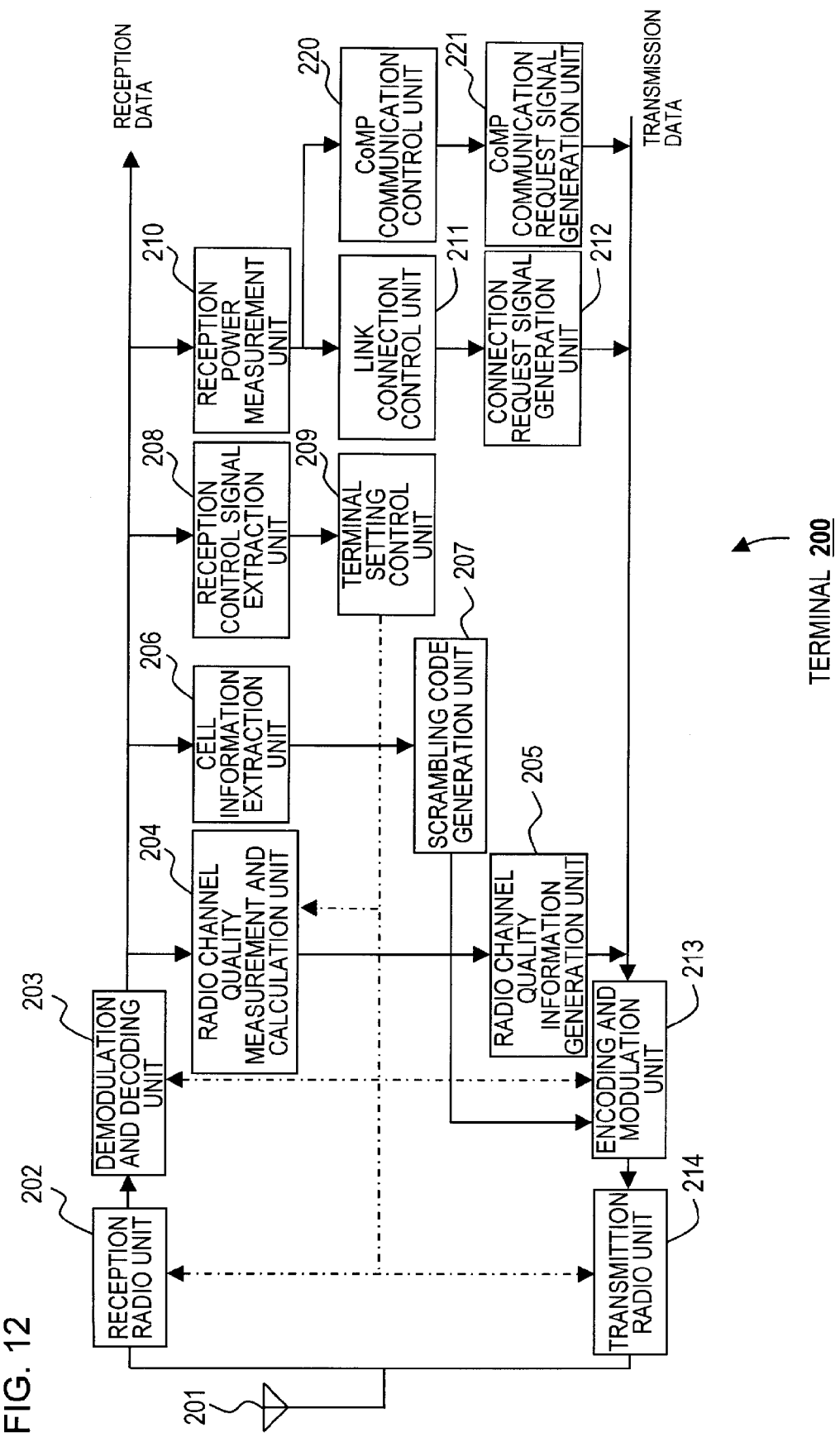
FIG. 12 illustrates a configuration example of a terminal apparatus.

Next, a configuration example of the terminal 200 in accordance with the second embodiment will be explained. FIG. 12 illustrates a configuration example of the terminal 200. This terminal 200 has similar configuration to the terminal 200 of the downlink (FIG. 5).

The terminal setting control unit 209 controls the encoding and modulation unit 213, so that the encoding process or the like is performed, according to the control signal, to the transmission data or the like be transmitted to base stations 100-1, 100-2. Also, the terminal setting control unit 209 controls the transmission radio unit 214 according to the precoding information included in the control signal, so that the different transmission data are weighted and transmitted to the base stations 100-1, 100-2.

Also, for performing the scrambling process to the transmission data or the like to be transmitted to the base stations 100-1, 100-2, the scrambling code generation unit 207 outputs the generated scrambling code to the encoding and modulation unit 213.

<A Configuration Example of the Scrambling Code Generation Unit>

The scrambling code generation units 112, 207 of each of the base stations 100-1, 100-2 and the terminal 200 are similar to those of the first embodiment.

<An Operation Example of Uplink>

Figure 13:
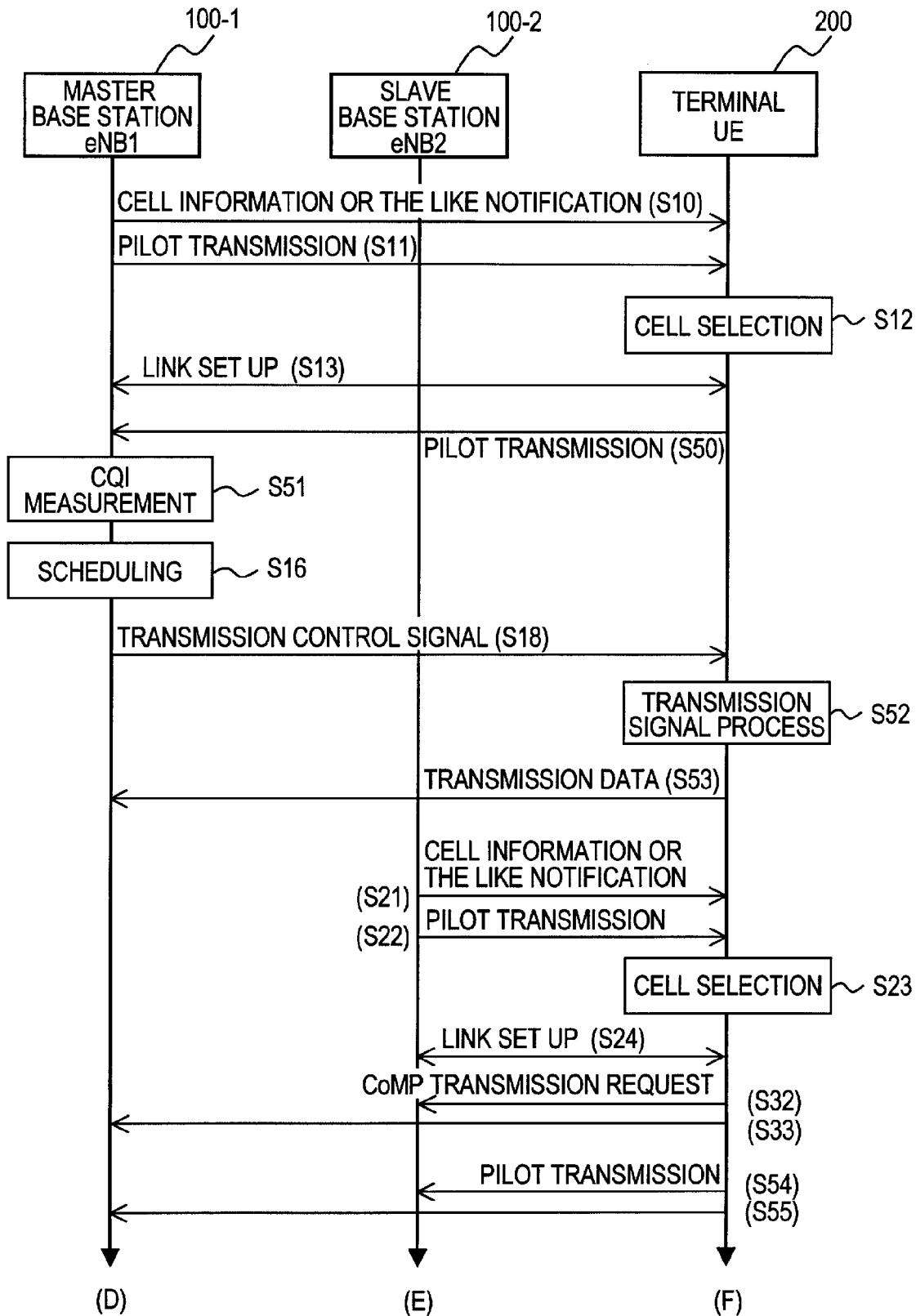
FIG. 13 is a flow-chart illustrating an operation example.
Figure 14:
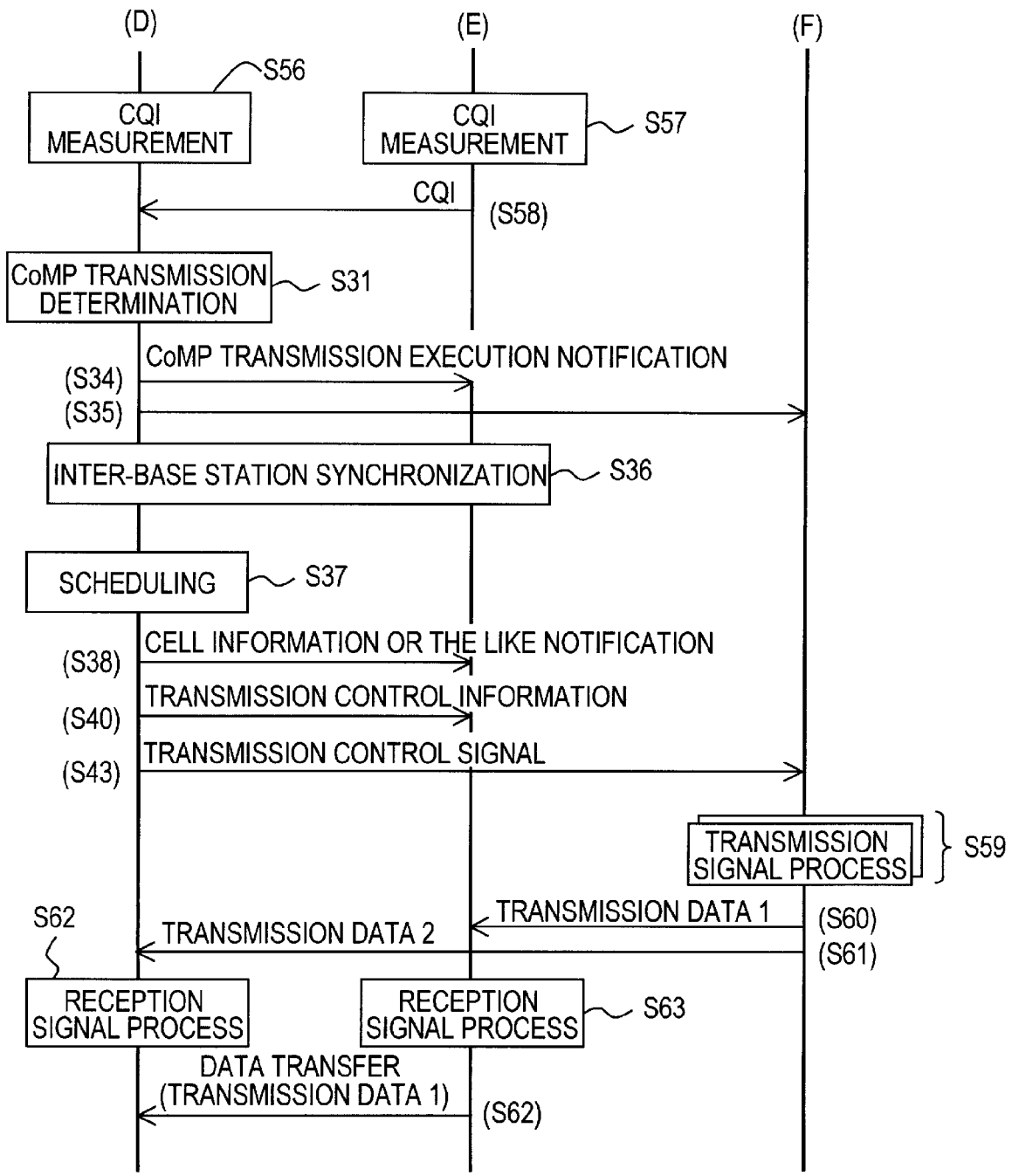
FIG. 14 is a flow-chart illustrating an operation example.

Next, an operation example in accordance with the second embodiment will be explained. FIG. 13 and FIG. 14 are flowcharts illustrating the operation example.

After setting up the link between the master base station 100-1 and the terminal 200 (S10-S13), the terminal 200 transmits the pilot signal to the master base station 100-1 (S50). For example, the transmission radio unit 214 of the terminal 200 generates and transmits the pilot signal. In the cell information which the master base station 100-1 transmits (S10), the cell information generated by the cell information signal generation unit 106 may be included.

Then, the master base station 100-1 measures the radio channel quality (for example, CQI) of the uplink based on the pilot signal (S51). For example, by the calculation unit 121 of the master base station 100-1, the determination and the like are performed.

Then, the master base station 100-1 performs the scheduling of the uplink based on the determined radio channel quality (S16). For example, the scheduler 110 performs the scheduling based on the radio channel quality output from the calculation unit 121.

Then, the master base station 100-1 transmits the control signal including the scheduling information of the uplink (S18), and the terminal 200 performs a transmission signal process according to the control signal (S52). For example, the control signal generation unit 111 of the master base station 100-1 generates the control signal including the scheduling information, and transmits it via the encoding and modulation unit 114. Also, the encoding and modulation unit 213 of the terminal 200 performs encoding and modulating process to the transmission data according to the scheduling information included in the received control signal.

Then, the terminal 200 transmits the transmission data to the master base station 100-1 (S53).

Then, the terminal 200 performs the link set up process or the like between the terminal 200 and the slave base station 100-2 (S21-S24). Then, between the terminal 200 and the base stations 100-1, 100-2 processes for CoMP transmission are performed.

First, the terminal 200 transmits the CoMP transmission execution request to each of the base stations 100-1, 100-2 (S32-S33). For example, the CoMP communication control unit 220 of the terminal 200 commands the CoMP transmission execution request if the reception power of each radio channel quality is equal to or more than the threshold value. The CoMP communication request signal generation unit 221, according to this command, generates the CoMP communication request signal, and transmits it to the base stations 100-1, 100-2.

Then, the terminal 200 transmits the pilot signal to each of the base stations 100-1, 100-2 (S54, S55).

Then, each of the base stations 100-1, 100-2 measures each radio channel quality (S56, S57). For example, by the calculation unit 121 of each of to the base stations 100-1, 100-2, the radio channel quality is measured.

Then, the slave base station 100-2 transmits the measured radio channel quality to the master base station 100-1 (S58). For example, the calculation unit 121 of the slave base station 100-2 transmits the measured radio channel quality to the master base station 100-1.

Then, the master base station 100-1 determines the execution of the CoMP transmission based on the two radio channel qualities (S31). For example, if the two radio channel qualities are both equal to or more than the threshold value, the control unit 108 determines to execute the CoMP transmission. Further, the threshold value to be compared with the radio channel quality determined and calculated by the master base station 100-1 and the threshold value to be compared with the radio channel quality determined and calculated by the slave base station 100 may be the same, or may be different.

When executing CoMP transmission, the master base station 100-1 transmits the CoMP transmission execution notice to the slave base station 100-2 and the terminal 200 (S34-S35).

Then, the master base station 100-1 performs a synchronizing process with the slave base station 100-2 (S36), and, after performing scheduling for CoMP transmission (S37), notifies the cell information to the slave base station 100-2 (S38), in a similar manner to the first embodiment. The cell information includes the cell number, the terminal number, and the slot number.

Then, the master base station 100-1 transmits to the slave base station 100-2 (S40) the transmission controlling information including the scheduling information (S37) of the transmission data or the like for the uplink, and transmits the control signal to the terminal 200 (S43). In the control signal, the cell information generated by the cell information signal generation unit 106 may be included. Also, in the transmission controlling information and the control signal, the operation frequency and the precoding information are included.

Then, the terminal 200 performs a transmission signal process according to the received control signal (S59). For example, the scrambling code generation unit 207 generates the scrambling code based on the cell information extracted by the cell information extraction unit 206 (S10 or S43), and outputs the generated scrambling code to the encoding and modulation unit 213. The encoding and modulation unit 213 performs, for example, the scrambling process by using a same (or common) scrambling code to the transmission data 1 and the transmission data 2 differing between the cells. Also, the terminal setting control unit 209 of the terminal 200 controls the encoding and modulation unit 213 so that the encoding process or the like is performed based on the received scheduling information. Further, the terminal setting control unit 209 controls the transmission radio unit 214 so that the transmission data weighted according to the precoding information included in the control signal is output.

Then, the terminal 200 transmits each different transmission data (for example, the transmission data 1 and the transmission data 2) to the master base station 100-1 and to the slave base station 100-2 (S60, S61). For example, the transmission radio unit 214 outputs the transmission data weighted according to the precoding information included in the control signal.

Then, the master base station 100-1 performs signal reception processes to the transmitted data 2 (S62). For example, the scrambling code generation unit 112 of the master base station 100-1 generates the scrambling code based on the slot number determined by the scheduler 110 (S37) and the cell number and the terminal number from the radio link control unit 105. The generated scrambling code is output to the demodulation and decoding unit 103, and the descrambling process is performed to the transmitted data 2. After that, the demodulation and decoding unit 103 performs demodulating and decoding processes or the like to the transmitted data.

Also, the slave base station 100-2 performs reception signal processes to the transmitted data 1 (S63). For example, the scrambling code generation unit 112 of the slave base station 100-2 generates the scrambling code based on the cell information transmitted from the master base station 100-1 (S38). The generated scrambling code is output to the demodulation and decoding unit 103, and the descrambling process is performed to the transmitted data 1. For example, the base stations 100-1, 100-2 respectively performs the descrambling processes to the transmitted data 1 and the transmitted data 2 by using the same scrambling codes to the scrambling code which the terminal 200 used in the scrambling process.

Then, the slave base station 100-2 transfers the transmitted data 1, which is demodulated or the like, to the master base station 100-1 (S64). For example, the demodulation and decoding unit 103 of the slave base station 100-2 transmits the transmitted data 1 to the master base station 100-1 under a control or the like of the scheduler 110.

As such, in this second embodiment, since the master base station 100-1 transmits the cell information to the slave base station 100-2 (S38), the slave base station 100-2 generates the same scrambling code to that of the master base station 100-1. Also, since the cell information is transmitted from the master base station 100-1 to the terminal 200, the terminal 200 is able to generate the same scrambling code to those of the base stations 100-1, 100-2. Therefore, in comparison to the case of generating different scrambling codes, this radio communication system 10 is enabled to reduce the processes. Also, by the terminal 200 on the transmission side and each of base stations 100-1, 100-2 on the reception side not generating the different scrambling codes, the electric power consumption may be reduced.

<Other Embodiments>

Next, other embodiments will be explained. In the above described embodiments, it is explained that the determination of CoMP transmission is performed by the master base station 100-1 (see S31 or the like of FIG. 8). For example, however, such the determination may be performed by the terminal 200. For example, the CoMP communication control unit 220 of the terminal 200 may make the determination based on the determined radio communication quality, according to whether or not the quality is equal to or more than the threshold value (S27 of FIG. 7). In this case, since the determined radio communication quality is not transmitted to the base stations 100-1, 100-2, processes of the to master base station 100-1 are further reduced.

Figure 15:
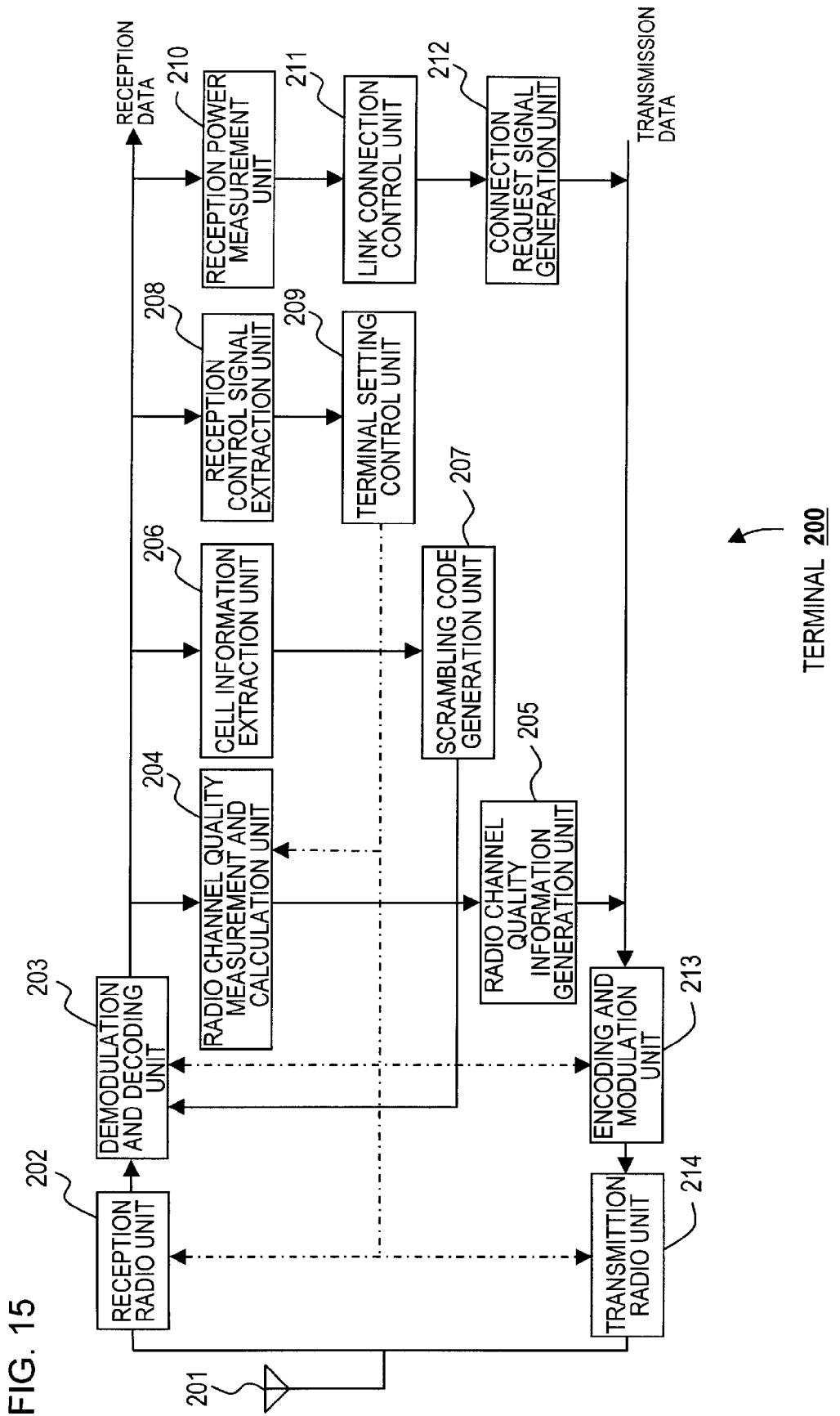
FIG. 15 illustrates a configuration example of a terminal apparatus.
Figure 16:
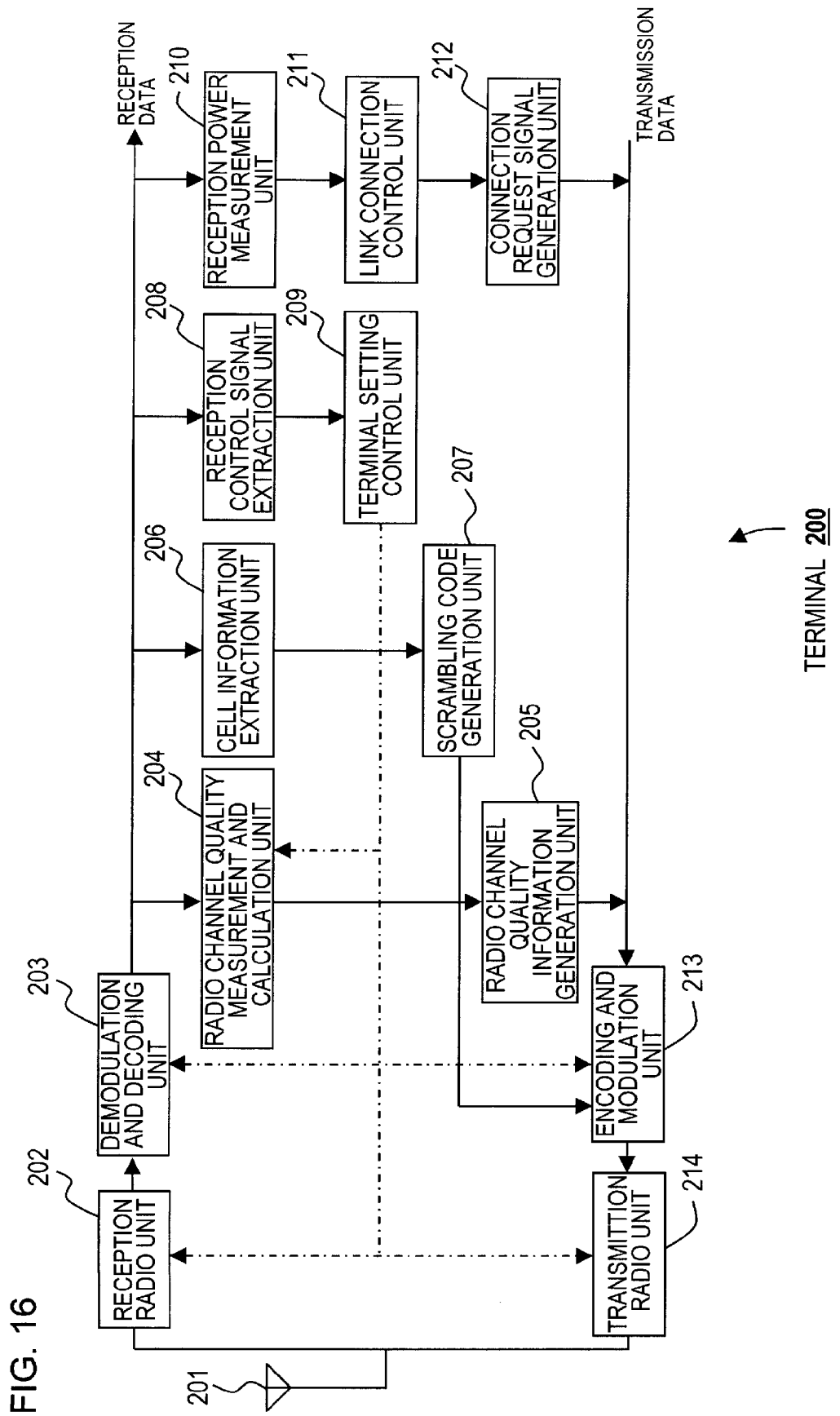
FIG. 16 illustrates a configuration example of a terminal apparatus.

Also, in the above described embodiments, it is explained that the CoMP transmission execution request is performed by the terminal 200. For example, however, the master base station 100-1 may perform the execution request. In the case of the downlink, for example, when the master base station 100-1 determines to execute the CoMP transmission (S31), the CoMP execution request may be transmitted to the terminal 200 and the slave base station 100-2. After that, the master base station 100-1 may perform the determination by notifying the execution notification (S34, S35). Also, as for the uplink, after the determination to execute the CoMP transmission (S31), the CoMP transmission request may be transmitted to the terminal 200 or the like, the CoMP execution notice is notified (S34-S35), and thus the determination is performed. A configuration example of the terminal 200 in such a case is illustrated in FIG. 15 (the case of the downlink) and in FIG. 16 (the case of the uplink). In comparison to the above described embodiments, since there are not the CoMP communication control unit 220 and the CoMP communication request signal generation unit 221, the terminal 200 further reduces the electric power consumption.

Figure 17:
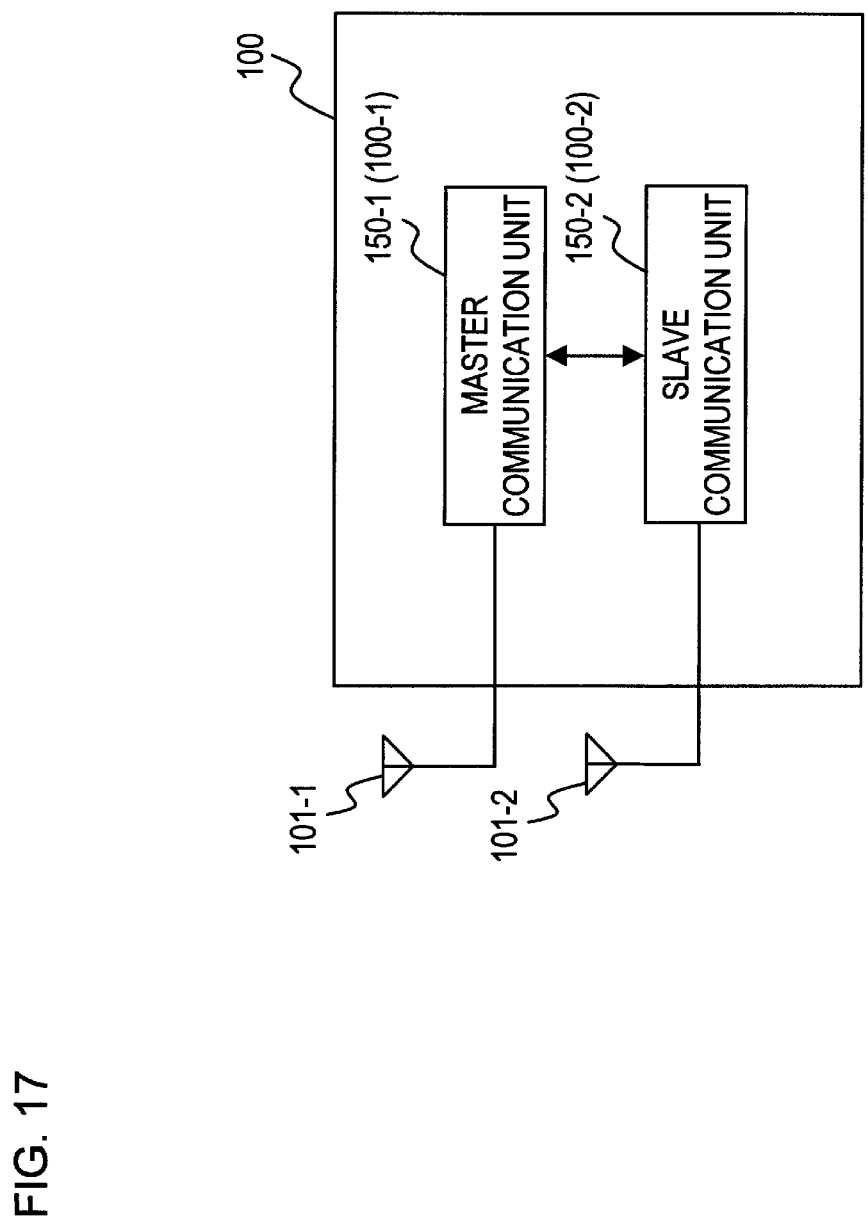
FIG. 17 illustrates a configuration example of a base station apparatus.

Further, in the above described embodiments, an example is explained in which the transmission data is transmitted from two base stations 100, that is, the master base station 100-1 and the slave base station 100-2. For example, however, a single base station 100 having a plurality of the cells (or, the sectors) may transmit the transmission data. FIG. 17 illustrates a configuration example of the base station apparatus 100. The base station apparatus 100 includes a master communication unit 150-1, a slave communication unit 150-2, and antennas 101-1, 101-2 each connected to communication units 150-1, 150-2. The master communication unit 150-1 includes the units 102 and the like within the master base station 100-1, and the slave communication unit 150-2 includes the units 102 and the like within the slave base station 100-2. For example, the slave communication unit 150-2 outputs the radio channel quality information to the master communication unit to 150-1, and the master communication unit 150-1 outputs the cell information or the like to the slave communication unit 150-2. Thereby, the base station 100 performs in the downlink and the uplink in a similar manner to the first and the second embodiments.

Further, in the above described embodiments, the cell number used for CoMP transmission, the terminal number, and the slot number are respectively replaced with a CoMP specific cell number, terminal number, and slot number. For example, when the control unit 108 of the master base station 100-1 determines the execution of the CoMP transmission (S31), the notice thereof is output to the cell information signal generation unit 106. The cell information signal generation unit 106 may rewrite, according to the notice, the cell number, the terminal number, and the slot number with the CoMP specific numbers. Also, since the cell information signal generation unit 106 transmits these to the slave base station 100-2 as the cell information, the slave base station 100-2 generates the same scrambling code to that of the master base station 100-1.

Further, in the above embodiments, an example is explained such that CoMP transmission is performed between the two base stations 100-1, 100-2, and the terminal 200. For example, however, the CoMP transmission may be performed between more than three base stations 100 and the terminal 200. In this case, any one of more than three base station being the master base station, and the other base station being the slave base station, the cell information is transmitted from the master base station to the plurality of the slave base station, in a similar manner to the above described embodiments.

EXPLANATION OF REFERENCE NUMERALS

10: radio communication system
100: base station apparatus (base station)
100-1: master base station
100-2: slave base station
103: demodulation and decoding unit
105: radio link control unit
106: cell information signal generation unit
107: Comp communication request signal extraction unit
108: Comp communication execution determination and control unit (control unit)
109: radio channel quality information extraction unit 110: scheduler
111: control signal generation unit
112: scrabling code generation unit
114: encoding and modulation unit
150-1: master communication unit
150-2: slace communication unit
200: terminal apparatus (terminal)
203: demodulation and decoding unit
204: radio channel quality measurement and calculation unit
205: radio channel quality information generation unit
206: cell information extraction unit
207: scrabling code generation unit
208: reception control signal extraction unit
209: terminal setting control unit
210: reception power measurement unit
213: encoding and modulation unit
220: Comp communication control unit
221: Comp communication request signal generation unit

What is claimed is:

1. A radio communication system comprising:
a first transmitter and one or more second transmitters which include one or more of cells or sectors respectively; and
a receiver configured to perform radio communication with the first transmitter and the one or the more second transmitters, wherein
the first transmitter includes:
a control information generation unit configured to transmit information for generating a common scrambling code by the first transmitter and the one or more second transmitters, to the one or more second transmitters,
the first transmitter and the one or more second transmitters include:
a process unit configured to perform a scrambling process to transmission data by using the common scrambling code respectively, when the transmission data in each of the cells or the sectors is transmitted to the receiver respectively; and
a transmission unit configured to transmit the scrambled transmission data to the receiver respectively, and
the receiver includes a reception unit configured to receive the scrambled transmission data and perform descrambling process to the scrambled transmission data by using the common scrambling code.

2. A transmitter including one or more of cells or sectors for performing radio communication with a receiver, the transmitter comprising:
a control information generation unit configured to transmit information for generating a common scrambling code to a different transmitter;
a process unit configured to perform a scrambling process to transmission data by using the common scrambling code, when the transmission data in each of the cells or the sectors is transmitted to the receiver; and
a transmission unit configured to transmit the scrambled transmission data to the receiver.

3. A receiver for performing radio communication with a first transmitter and one or more second transmitters including one or more cells or sectors, the receiver comprising:
a reception unit configured to receive scrambled transmission data from the first transmitter and the one or more second transmitters, and perform descrambling process to the scrambled transmission data by using a common scrambling code, wherein
information for generating the common scrambling code is transmitted from the first transmitter to the one or more second transmitters, and the scrambled transmission data is generated by the first transmitter and the one or more second transmitters.

4. A radio communication method in a radio communication system for performing radio communication between a receiver and a first transmitter or one or more second transmitters including one or more of cells or sectors, the method comprising:
transmitting information for generating a common scrambling code by the first transmitter and the one or more second transmitters to the one or more second transmitters, by the first transmitter,
performing a scrambling process to transmission data by using the common scrambling code respectively, when the transmission data in each of the cells or the sectors is transmitted to the receiver respectively, by the first transmitter and the one or more second transmitters;
transmitting the scrambled transmission data to the receiver respectively, by the first transmitter and the one or more second transmitters; and
receiving the scrambled transmission data and performing descrambling process to the scrambled transmission data by using the common scrambling code, by the receiver.

5. A radio communication method in a transmitter including one or more of cells or sectors, for performing radio communication with a receiver, the method comprising:
transmitting information for generating a common scrambling code to a different transmitter, by a control information generation unit;
performing a scrambling process to transmission data by using the common scrambling code, when the transmission data in each of the cells or the sectors is transmitted to the receiver, by a process unit; and
transmitting the scrambled transmission data to the receiver, by a transmission unit.

6. A radio communication method in a receiver for performing radio communication with a first transmitter and one or more second transmitters including one or more cells or sectors, the method comprising:
receiving scrambled transmission data from the first transmitter and the one or more second transmitters, and performing descrambling process to the scrambled transmission data by using a common scrambling code, by a reception unit, wherein
information for generating the common scrambling code is transmitted from the first transmitter to the one or more second transmitters, and the scrambled transmission data is generated by the first transmitter and the one or more second transmitters.

* * * * *